(12) United States Patent
Manning

(10) Patent No.: US 6,469,790 B1
(45) Date of Patent: Oct. 22, 2002

(54) TILT-COMPENSATED INTERFEROMETERS

(76) Inventor: Christopher J. Manning, 502 S. Blaine St., Moscow, ID (US) 83840

( * ) Notice: Subject to any disclaimer, the term of this patent is extended or adjusted under 35 U.S.C. 154(b) by 0 days.

(21) Appl. No.: 09/299,022

(22) Filed: Apr. 26, 1999

Related U.S. Application Data

(63) Continuation-in-part of application No. 08/959,030, filed on Oct. 28, 1997, now Pat. No. 5,898,495.
(60) Provisional application No. 60/029,364, filed on Oct. 28, 1996, provisional application No. 60/034,996, filed on Jan. 7, 1997, and provisional application No. 60/052,488, filed on Jul. 14, 1997.

(51) Int. Cl.[7] .................................................. G01B 9/02
(52) U.S. Cl. ...................................... 356/451; 356/455
(58) Field of Search ................................ 356/450, 451, 356/452, 455

(56) References Cited

U.S. PATENT DOCUMENTS

| 3,809,481 | A | 5/1974 | Schindler |
| 4,179,219 | A | 12/1979 | Smith |
| 4,181,440 | A | 1/1980 | Schindler |
| 4,193,693 | A | 3/1980 | Schindler |
| 4,278,351 | A | 7/1981 | Frosch |
| 4,383,762 | A | 5/1983 | Burkert |
| 4,391,525 | A | 7/1983 | Woodruff |
| 4,654,530 | A | 3/1987 | Dybwad |
| 4,881,815 | A | 11/1989 | Sommargren |
| 4,915,502 | A | 4/1990 | Brierley |
| 5,108,184 | A | 4/1992 | Brown et al. |
| 5,148,235 | A | 9/1992 | Tank et al. |
| 5,191,391 | A | 3/1993 | Tsai |
| 5,309,217 | A | 5/1994 | Simon et al. |
| 5,341,207 | A | 8/1994 | Tank et al. |
| 5,400,143 | A | 3/1995 | Bauer |
| 5,457,529 | A | 10/1995 | Tank et al. |
| 5,471,304 | A | 11/1995 | Wang |
| 5,491,551 | A | 2/1996 | Mattson |
| 5,675,412 | A | 10/1997 | Solomon |
| 5,808,739 | A | 9/1998 | Turner et al. |
| 5,898,495 | A | * 4/1999 | Manning .................... 356/346 |

OTHER PUBLICATIONS

M. Bottema and H. J. Bolle, *An Interferometer with Spherical Mirrors for Fourier Spectroscopy*, in the Aspen Int. Conf. on Fourier Spectroscopy, pp. 211–214.

(List continued on next page.)

*Primary Examiner*—Frank G. Font
*Assistant Examiner*—Andrew H. Lee

(57) ABSTRACT

A novel variation of Michelson's interferometer uses tilt- and shear-compensation optics to allow various mirror motions to produce variation of path difference. The tilt-compensation mechanism consists of two complementary reflections from a single plane mirror and, in some cases, the beamsplitter, to produce a beam having a constant angle of propagation, typically the same as the input beam. Using a retroreflector to invert the image of a single plane mirror or a sequence of plane mirrors before the second reflections produces complementary reflections. A particularly efficient embodiment of the present invention uses one or more balanced disk-shaped mirrors to effect very rapid variation of path difference by nutation or precession. Other advantages of tilt-compensation include photometric stability. This interferometer has applications in spectrometry, spectral imaging and metrology.

86 Claims, 20 Drawing Sheets

OTHER PUBLICATIONS

P.R. Griffiths and J. A. de Haseth, *Fourier Transform Infrared Spectrometry*, pp. 145 and 164 (New York: John Wiley and Sons, 1986).

W. H. Steel, Aspen Int. Conf. On Fourier Spectroscopy, 1970, *Interferometers for Fourier Spectroscopy*, (G. A. Vanasse, A. T. Stair, and D.J. Baker, eds.) AFCRL–71–0019, pp. 43–53 (1971).

J. Kauppinen, I. K. Salomaa, and J. O. Partanen, *Carousel interferometer*, Applied Optics, vol. 34, No. 27, pp. 6081–6085 (Sep. 20, 1995).

A. S. Zachor, *Drive nonlinearities: their effects in Fourier spectroscopy*, Applied Optics, vol. 16, No. 5, pp. 1412–1424 (May 1977).

Excerpt, S. T. Smith and D. L. Decker, *Spiralling Toroidal Spectrometer*, Proc. IRIS vol. 30, No. 2, p. 133 (1985).

A. S. Zachor and S. M. Aaronson, *Delay compensation: its effect in reducing sampling errors in Fourier spectroscopy*, Applied Optics, vol. 18, No. 1, pp. 68–75 (Jan. 1, 1979).

* cited by examiner

TILT-COMPENSATED INTERFEROMETERS

This application, is a continuation-in-part of application Ser. No. 08/959,030 filed Oct. 28, 1997 now U.S. Pat. No. 5,898,495 which are based on provisional application Ser. Nos. 60/029,364 filed Oct. 28, 1996, 60/034,996 filed Jan. 7, 1997 and 60/052,488 filed Jul. 14, 1997.

BACKGROUND AND SUMMARY OF THE INVENTION

The objects of the present invention are to generate interferometric signals more accurately and more precisely, and in some cases, more rapidly than is possible with present art. Accordingly a new class of tilt-compensated interferometer designs for generating interferometric signals is disclosed.

The subject area of the invention is tilt-compensation of multiple reflecting surfaces. A recently-approved application, Ser. No. 08/959,030 which disclosed optics for tilt-compensation of the moving mirror of an interferometric spectrometer, is included by reference for the entirety of its disclosure. The tilt-compensation was effected by the use the use of two complementary reflections at a flat moving mirror. The present disclosure expands the use of this tilt-compensation mechanism to a larger class of interferometers in which the compensated complementary reflections occur at one or more planar surfaces which may include the beamsplitter. A variety of motions may be applied to the moving planar surfaces to introduce path difference scanning. In conventional Michelson interferometers, tilt errors of the planar mirrors compromise photometric accuracy and interferometric efficiency. Baseline errors will also be introduced into spectra measured with instruments having tilt errors. Considerable effort has been expended in constructing interferometers which have electronic servomechanisms to adjust the tilt of planar interferometer mirrors. Considerable effort has also been expended in constructing interferometers having intrinsic optical tilt-compensation. The present invention expands the area of intrinsic optical tilt-compensation by applying a novel approach to tilt-compensate moving planar mirrors and applying a known approach for tilt-compensating beamsplitter. Thus, the present invention allows construction of interferometers that may be permanently aligned and more stable than known ways. A variety of applications will benefit from these improvements.

The tilt-compensation approach for the beamsplitter is known in, for example, Schindler, U.S. Pat. Nos. 3,809,481, 4,181,440, 4,193,693, Frosch, U.S. Pat. No. 4,278,351 and Woodruff, U.S. Pat. No. 4,391,525. The primary moving mirrors are retroreflectors and the planar mirrors were generally fixed. In the cases where a planar mirror did move, it was for correcting path difference errors introduced by imperfections in the motion of the retroreflectors. The planar reflectors make these interferometers more compact by folding the beams. Reference is also made to Solomon, U.S. Pat. No. 5,675,412 and Turner and Mould, U.S. Pat. No. 5,808,739 as well as a commercial product from Bomem (450, avenue St-Jean-Baptiste, Quebec, Quebec, G2E 5S5, Canada), the MB-100 Fourier spectrometer. The Bomem instrument uses beamsplitter, as is also shown in, for example Learner, U.S. Pat. No. 4,779,983 and Izumi, U.S. Pat. No. 4,932,780.

Tilt compensation by complementary reflections is shown in FIG. 1. A primary beam of radiation from a collimated source 10 propagates to a beamsplitter 30. The beamsplitter 30 may have a coating 32 intended to be partially reflective and partially transmitting. The primary radiation beam divided at the beamsplitter coating 32 propagates in two directions. The first energy beam is reflected by coating 32 and enters a first optical path. The second energy beam is transmitted by coating 32 and enters a second optical path. The term arm may be used interchangably with first or second optical path.

The reflected first energy beam, in the case of FIG. 1, propagates to a retroreflector 70 which returns the beam with an offset, but with a propagation angle exactly antiparallel to the incident beam. The returned first energy beam propagates to the beamsplitter 30 where it may impinge on a reflective coating 34. The beam then makes a second reflection from the beamsplitter at 34 and propagates to a fixed reflector 80 which may be flat. The first energy beam propagating towards 80 is necessarily parallel to the primary energy beam to the extent that the beamsplitter coatings 32 and 34 are exactly parallel and to the extent that the retroreflector 70 is optically perfect. In practice, these conditions can be met with sufficient accuracy for useful interferometric measurements. If the reflector 80 is oriented perpendicularly to the primary energy beam, the reflection which occurs for the first energy beam will be at exactly normal incidence causing this beam to exactly reverse its course through the first optical path where it will reach the coating 32 and recombine with a portion of the second energy beam which has traversed the second optical path. FIG. 1 only indicates such a moving mirror in the second optical path. It will be shown that one or more moving planar reflectors may be included in either or both of the first and second optical paths.

The second energy beam initially transmitted through the coating 32 impinges on a movable flat mirror 50 then propagates to a retroreflector 60. The retroreflector 60 returns the second energy beam exactly parallel and inverted. The inverted beam may then impinge a second time on the planar surface of 50 and then propagate to return reflector 80. The beam may pass through an uncoated portion of the substrate 30, or a compensator plate according to Woodruff, in transit from mirror 50 to reflector 80 and vice versa. The second energy beam as it propagates to the return reflector 80 is necessarily perpendicular to the primary energy beam to the extent of optical perfection of the components. As before, to the extent that reflector 80 is aligned perpendicular to the primary energy beam from the source 10, then the impingement of the second energy beam on 80 will be at exactly normal incidence. This completes one half of the traversal of the second optical path. Because of the perpendicular incidence, reflector 80 returns the second energy beam exactly on the inverse of the first half of its traversal of the second optical path, thus returning it to the beamsplitter 30 with optical precision. The four reflections at the mirror 50 are pairwise complementary such that the beam returning to the beamsplitter 30 via the second optical path is exactly antiparallel to the second energy beam initially entering the second optical path from the beamsplitter 30.

The two reflections of the first energy beam from the beamsplitter at coatings 32 and 34 are complementary. Hence, the beam propagating from the reflective coating 34 to reflector 80 is exactly parallel to the primary beam propagating from the source 10 to the beamsplitter 30 and its coating 32. Likewise, the beam propagating from retroreflector 60 to reflector 80, which may pass through a compensator plate, or an uncoated portion of the substrate 30 or pass around substrate 30, will be exactly parallel to the beam propagating from beamsplitter 30 and its coating 34 to reflector 80. At reflector 80, the first and second energy beams reverse their direction of propagation and return to the beamsplitter 30 by the exact inverse of their paths from it. At the beamsplitter 30, particularly coating 32, the returning first and second energy beams are both split again and form two recombined beams at coating 34. One of the recombined radiation beams returns to the source 10 and is effectively lost. The other recombined energy beam propagates to a detector 20 by a path which may include other optics and/or material to be measured as is commonly practiced in the use of interferometers.

Tilt of reflector 80 will produce only second order misalignment (motion of the source 10 image on the detector 20) because the optical alignment of the wavefronts will be preserved by the equal effect of the tilt of reflector 80 on both the first and second energy beams. It will be appreciated that the misalignment of any component in FIG. 1 will have at most second order effect. The path difference between the first and second optical paths of the interferometer thus formed may be varied or scanned by moving reflectors 50, 60 or 70, or any combination of these. Motion of reflector 80 does not usefully introduce path difference between the two arms of the interferometer, i.e., between the first and second optical paths, because it affects both equally. This optical arrangement improves on known systems. The present invention uses tilt compensation for both the beamsplitter and the moving mirrors of a class of related interferometers.

All of these objectives, features and advantages of the present invention, and more, are illustrated below in the drawings and detailed description that follows.

DETAILED DESCRIPTION

Figure 1:
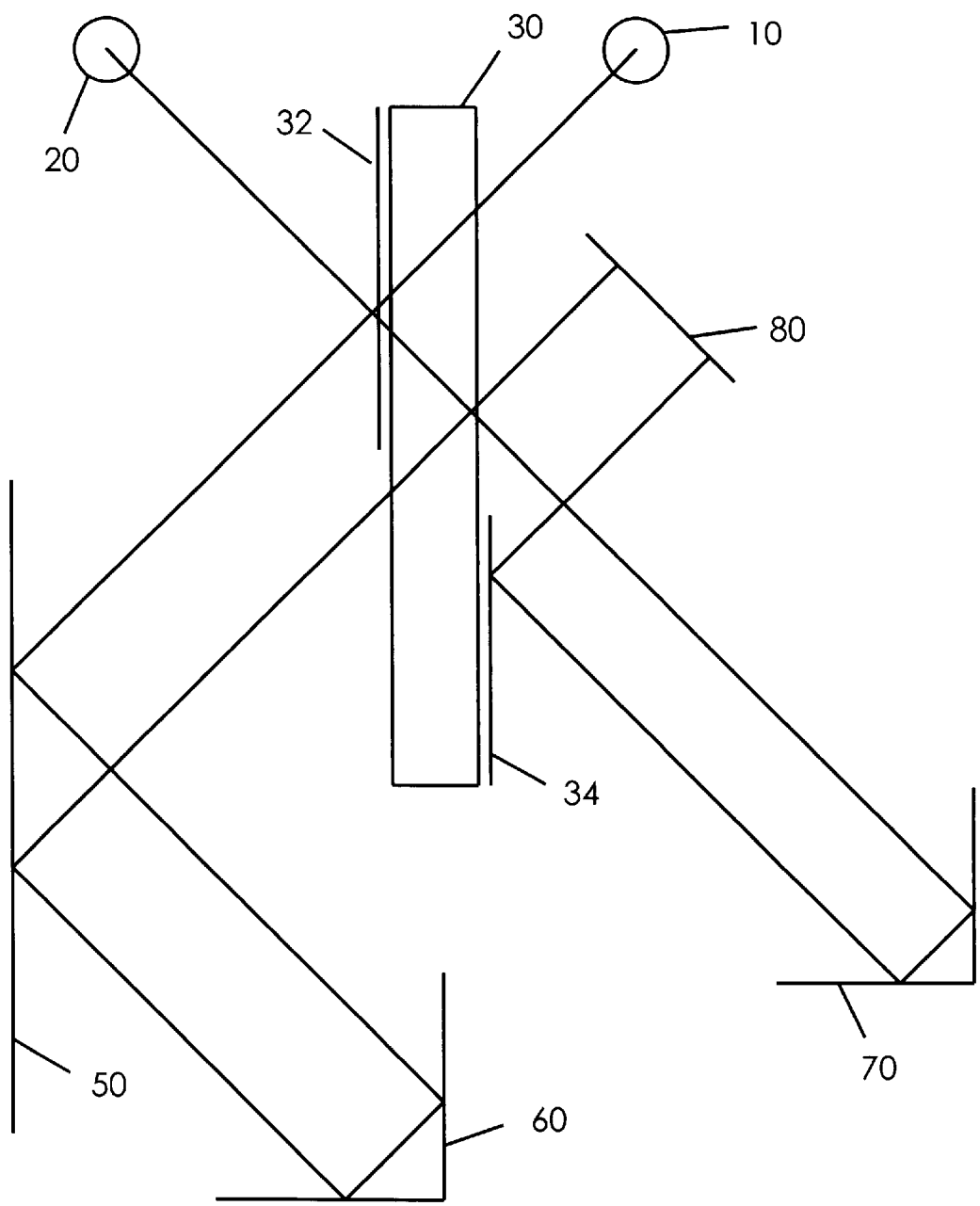
FIG. 1 is a diagram of an interferometer incorporating a tilt-compensation mechanism comprised of two retroreflectors to produce complementary reflections at a moving mirror and the beamsplitter.

FIG. 1 uses of a tilt-compensated beamsplitter and a tilt-compensated moving mirror. The beamsplitter has two reflective coatings, one partially reflecting, the second essentially totally reflecting. Further, the single substrate beamsplitter intrinsically compensates the paths of the beams for dispersion. Other approaches are known for cube corner interferometers that depend on two beamsplitting coatings on opposite sides of the substrate rather than a single one. Other designs do not require a metal reflector, such as 34, nor do they use an uncoated portion of the beamsplitter, such as shown in FIGS. 2g and 2h, for dispersion compensation by passage through an equal thickness of material. Dispersion compensation is achieved by the fact that both beams pass through an equal thickness of substrate material after passing through the beamsplitting coating. In both cases it is quite straightforward and inexpensive to manufacture a beamsplitter which must only be very flat rather than having multiple components of matched thickness which must be aligned to very close tolerances. The beamsplitter of FIG. 1 is detailed in FIG. 2c.

Following the discussion of FIG. 1 above, it will be appreciated that the first energy beam which is initially reflected at coating 32 passes through the exact same thickness of substrate 30 material as the second energy beam which is transmitted at coating 32. Both beams at coating 32 have passed through one thickness of substrate 30, while still components of the primary energy beam. The first energy beam passes through one additional thickness of the substrate on transit from the coating 32 to retroreflector 70 and reflector 80, then a second thickness on transit back from retroreflector 70 and reflector 80. The second energy beam passes through one more thickness after reflection from retroreflector 60 propagating to reflector 80 via mirror 50. This second energy beam then passes through a second thickness as it traverses from reflector 80 back to mirror 50, and a third thickness on return to mirror 50 from retroreflector 80. Both of these passages occur at a portion 36 of the beamsplitter substrate 30 which is uncoated as shown in FIG. 2g or FIG. 2h. This is the last pass through the beamsplitter substrate for the portion of the second energy beam which reaches the detector 20. Thus both the first and second energy beams, originating from the source, which are split at 32, pass through exactly three thicknesses of the substrate 30 at the same angle.

The coating 34 is understood to be comprised of a material reflective to the radiation of interest. For example, gold would be a suitable material for mid-infrared application. The coating 34 may be formed in several known ways. One embodiment uses the process of replication to adhere the reflective layer 34 to the beamsplitter substrate 30. In this process, the reflective coating 34 is first deposited on an optical master. The optical master is preferably flat and may be coated with a lubricant to effect release. A thin layer of adhesive, which may be epoxy, is then applied to either the optical master or to the beamsplitter substrate 30. The optical master and the substrate 30 are then pressed together and the adhesive cured. After curing, the optical master is separated from the beamsplitter assembly 30 leaving a thin adhesive layer and the reflective coating 34. The layer of adhesive will have conformed to any irregularities in the substrate surface. Its other surface will have conformed to the very flat optical master through the coating 34. Hence, the reflecting surface 34 will maintain its flatness after removal of the optical master. A variety of other known methods may be used to form a suitable reflective coating. These methods may include sputtering, electroless plating, electroplating, and vacuum evaporation.

Spurious reflections may occur at interfaces between the substrate material 30 and air. One approach to reducing the effect of spurious reflections is to wedge the beamsplitter substrate 33 and compensator plate 31. An interferometer according to this approach, but implementing the tilt-compensation of the present invention is shown and 5. FIGS. 2e, 2g and 2h show aspects of the beamsplitter. A reflective coating 34 is interposed between a compensator plate 31 and a beamsplitter substrate plate 33. The purpose of insuring that the first and second energy beams pass through an equal thickness of material is accomplished to the extent that the plates 31 and 33 are matched in thickness, wedge angle and orientation. Another approach to controlling spurious reflections is to alter the thickness of the beamsplitter to move the spurious reflections either further from or closer to the intentional reflections.

Figure 2:
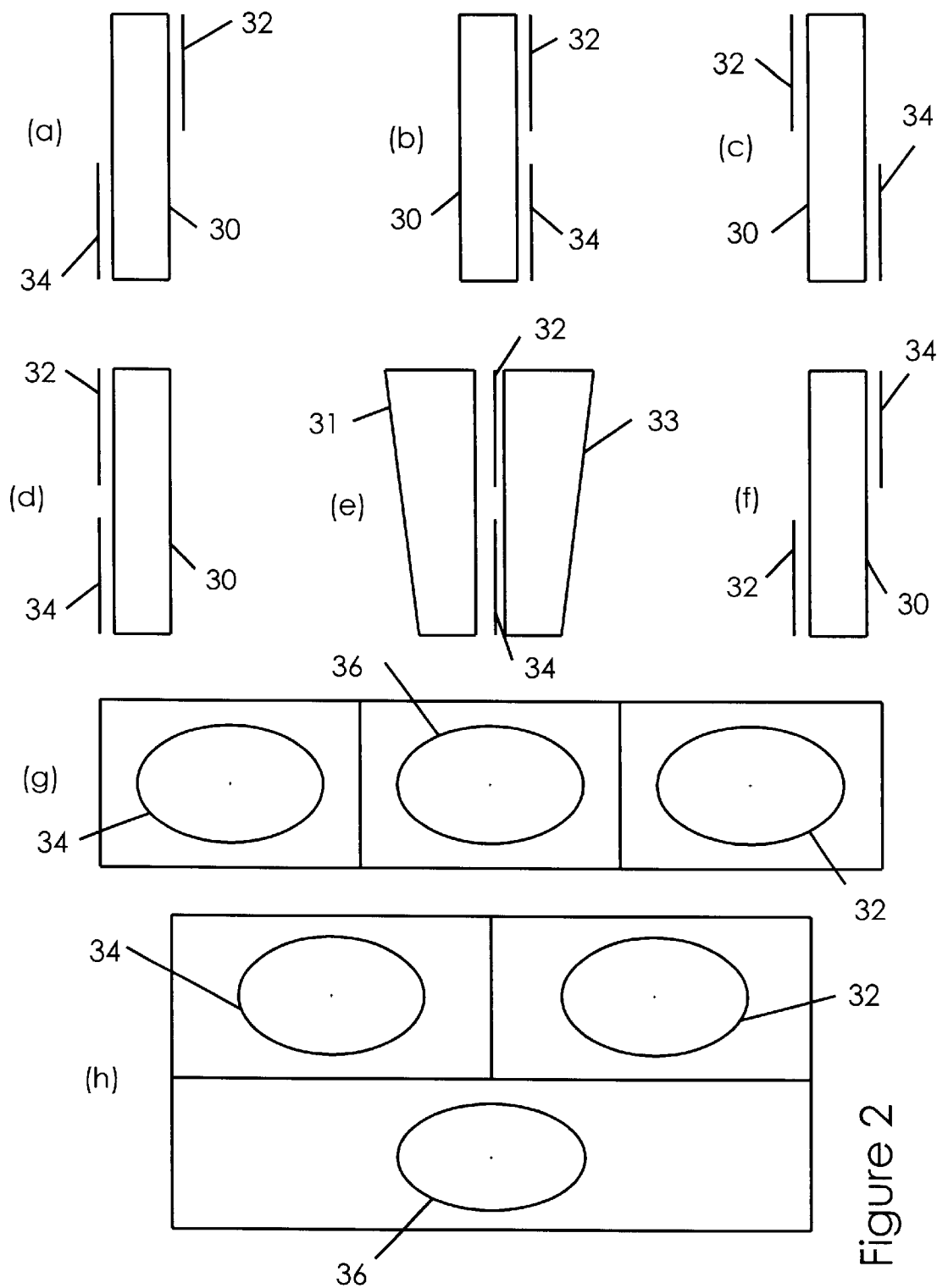
FIG. 2 is a diagram of a series of beamsplitter, in which a second coating on the beamsplitter facilitates complementary reflections.

FIG. 2 shows a series of beamsplitter that may be used interchangably in the interferometers described herein. Each has its own strengths and weaknesses. The operation of each beamsplitter variation is illustrated in one of the accompanying figures of complete interferometers. FIG. 2a–FIG. 2d and FIG. 2f show a series of single substrate beamsplitter. The illustration is meant to show possible variations of the placement of the reflective coatings 32 and 34. Only when the coatings 32 and 34 are on the same side of the substrate can the two surfaces be polished to a wedged shape. Hence, FIGS. 2a, 2c and 2f are understood to have parallel sides on which the coatings 32 and 34 are formed. FIG. 2e shows a variation in which the coatings 32 and 34 are formed on a single plate 33 and a compensator plate 31 has been added. FIGS. 2g and 2h show two variations of the arrangement of coatings 32 and 34 looking at the surfaces of the substrate 30 and 33 straight on. The first and or second energy beams may pass through clear portion indicated by 36 of the substrate 30 or substrate 33 and compensator 31. These general types of beamsplitters have appeared before.

Figure 3:
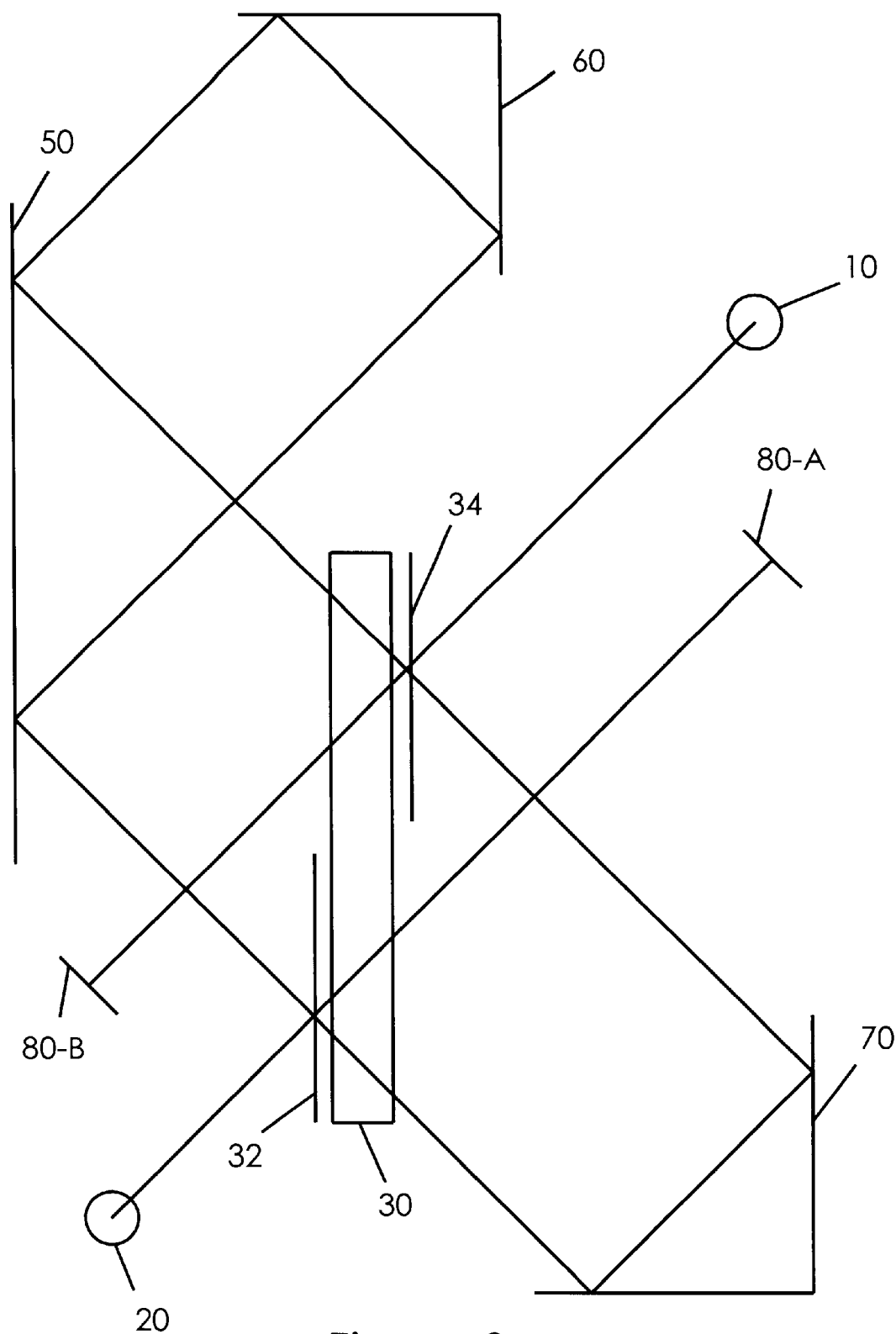
FIG. 3 is a diagram of a variation of the interferometer of FIG. 1 in which the order of incidence of radiation on the partially reflective coating and the fully reflective coating is reversed.

The interferometer arrangement of FIG. 3 is shown for conceptual completeness. In this arrangement the primary energy beam from source 10 first impinges on a reflective coating 34 on the beamsplitter substrate 30. This causes the primary energy beam to assume a propagation direction that is governed by the tilt angle of the beamsplitter 30. Hence, upon return from the retroreflector 70 to the beamsplitter coating 32, a first energy beam is formed by reflection. This reflection is complementary with the reflection of the primary beam at coating 34. Hence, the first energy beam assumes a propagation angle independent of the beamsplitter 30 tilt and exactly antiparallel to the primary energy beam propagating from source 10 to beamsplitter coating 34. Thus, the first energy beam impinges on reflector 80A with an angle which is independent of beamsplitter 30 tilt. A second energy beam is also formed by transmission at coating 32. The propagation angle of the second energy beam formed at coating 32 is still dependent on the tilt of the beamsplitter due to the first reflection at coating 34. The second energy beam propagates to mirror 50, then to retroreflector 60 where it is offset, inverted and returned to the beamsplitter at coating 34. The second energy beam then makes a second reflection from coating 34 such that the beam propagating to reflector 80B is exactly parallel to the primary energy beam. If the reflector 80B is aligned perpendicular to the primary energy beam, the reflection of the second energy beam at 80 will always be at normal incidence. The second energy beam will then retrace its path from the beamsplitter 30 in reverse order and a portion of the second energy beam will recombine with a portion of the first energy beam. In this arrangement, the moving mirror 50 can only be located in the second optical path because there is no retroreflector in the first optical path to allow for tilt compensation. One disadvantage of this arrangement is that the two optical paths pass through different thicknesses of material. Hence, dispersion compensation is incomplete. This problem may be remedied by the use of a compensator plate, in particular by substituting the beamsplitter diagrammed in FIG. 2e.

An alternative to the beamsplitter arrangement of FIG. 2c places the partially reflective coating 32 on the side of beamsplitter substrate 30 a towards the source 10 and is shown in FIG. 2a. A suitable optical layout is diagrammed in FIG. 4. Further, the reflective coating 34 has been moved to the side of the substrate 30 nearer the detector 20. The net effect of the optics is the same in FIGS. 1 and 4 in that tilt-compensation for all components is effected while the beams in the first and second optical paths of the interferometer make an equal number of passes through the beamsplitter substrate 30. The case of FIG. 1 has already been described and it was shown that both the first and second optical paths make three passes through the beamsplitter substrate.

Figure 4:
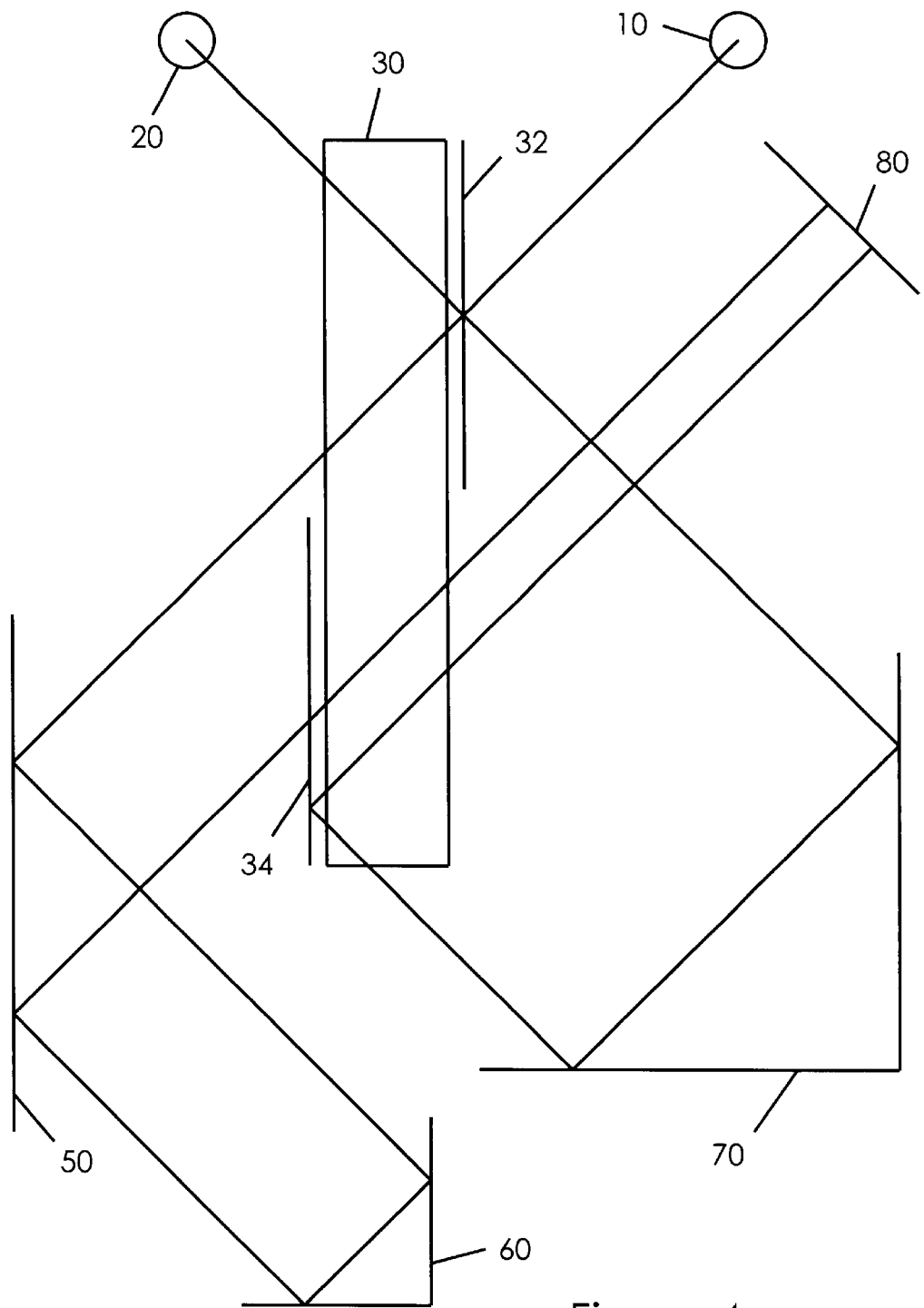
FIG. 4 is a diagram of a variation of the interferometer of FIG. 1 in which the sides of the substrate which support the fully reflective and partially reflective coatings are reversed.

In the case of FIG. 4 the first energy beam initially reflected at coating 32 passes to the retroreflector 70 without passing through the substrate initially. It then passes through the substrate twice in transit from retroreflector 70 to reflector 80, then twice more in transit from reflector 80 back to retroreflector 70. A fifth and final pass through the substrate 30 occurs after traversing from retroreflector 70 back to coating 32 and through to detector 20. The beam initially transmitted at coating 32 also makes five passes through substrate 30. The first pass through the substrate 30 occurs in transit from coating 32 to retroreflector 60 via mirror 50. The second pass occurs in transit from mirror 50 to reflector 80. The third pass occurs in transit from reflector 80 back to mirror 50. The fourth pass occurs on transit from retroreflector 60 to coating 32. The final pass through the substrate occurs during transit from coating 32 to detector 20. Thus, the beams in both optical paths of the interferometer traverse five equal thicknesses of material.

Figure 5:
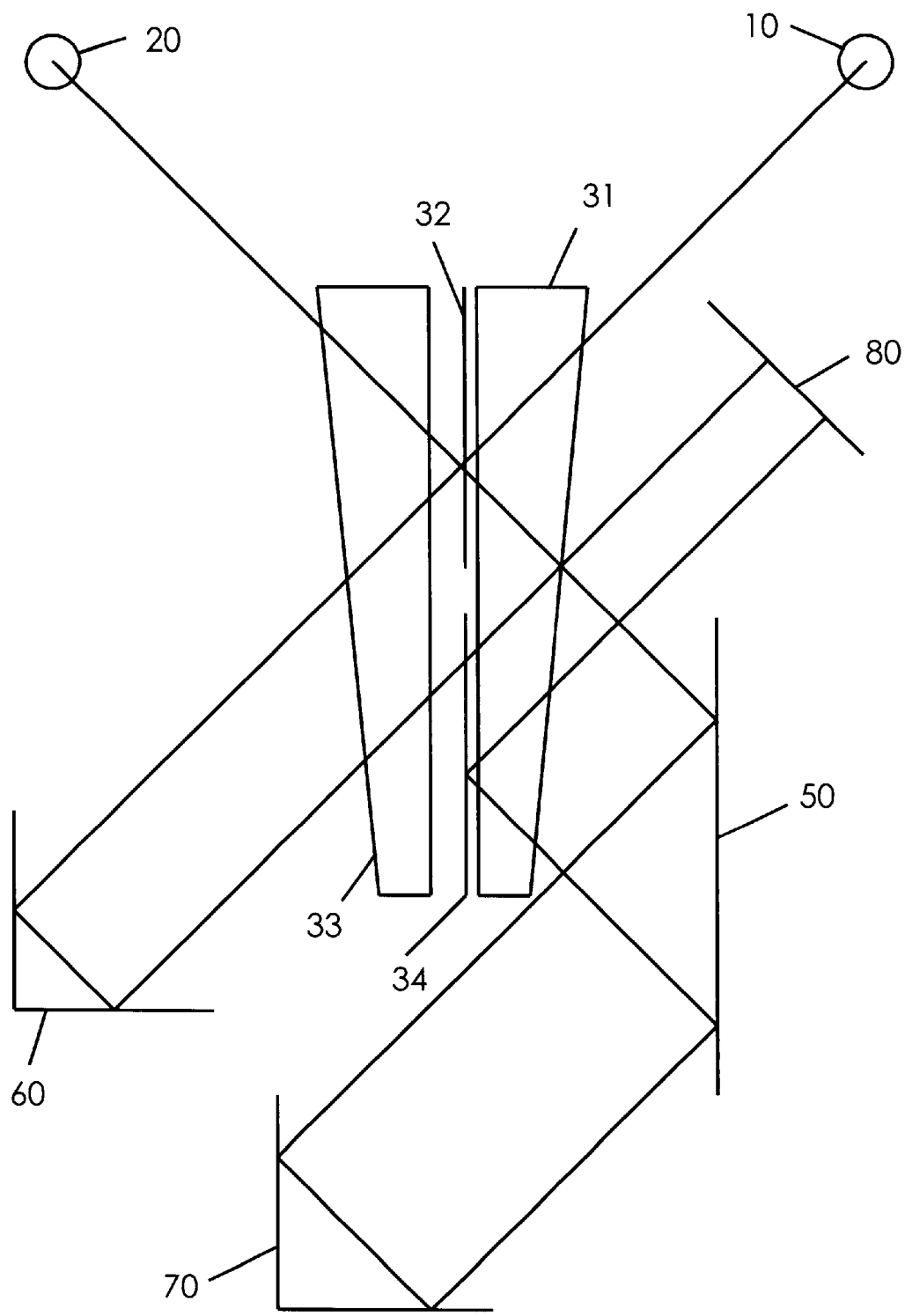
FIG. 5 is a diagram of a variation of the interferometer of FIG. 1 in which compensation is effected by a compensator plate; the moving mirror is in the first optical path.

The beamsplitter variation of FIG. 2e is a component of the interferometer diagrammed in FIG. 5. One difference is that the compensator may be now a conventional wedged plate 31. The primary beam from the source 10 passes through a wedged substrate 33 where it may impinge on a partially reflective coating 32 to form first and second beams of radiant energy. As before, these beams may pass to retroreflector assemblies in the first and second optical paths the interferometer. The first and second optical paths may include a common reflector 80. It is not necessary that the final reflector 80 be a single piece. Two separate reflectors may be used in place of 80 as in the previous disclosure, but it is very convenient that tilt of reflector 80 is compensated when it is a single unit. Together substrate 33 and compensator 31 take the place of the substrate 30 of FIG. 1. Otherwise operation is similar.

The first energy beam reflected at coating 32 has already passed through one thickness of substrate 31 while still a component of the primary energy beam. After reflection by coating 32 the first energy beam then passes through a second thickness of substrate 31 on transit to the retroreflector 70 via mirror 50, then two more thicknesses during passage to reflector 80. After reflection from 80 the first energy beam passes through two more thicknesses of substrate 31 in transit to retroreflector 70 via mirror 50. One of these passes occurs just before reflection by coating 34 and the other just after reflection. After retracing its original path through the retroreflector 70, the first energy beam passes again through the thickness of substrate 31 a seventh time then makes one pass through the thickness of compensator plate 33 for a total of eight passes through 31 and 33.

The second energy beam while it is still a component of the primary energy beam makes one pass through substrate 31 on transit to coating 32. After transmission through the coating 32, the second energy beam makes a pass through the compensator plate 33 in transit to the retroreflector 60. After offset, inversion and parallel return the second energy beam makes a second pass through the compensator plate 33, and a second pass through the beamsplitter substrate 31. It then makes a third pass through each of plates 31 and 33 during transit from reflector 80 back to the retroreflector 60. A fourth and fifth pass are made through the compensator plate 33 by the second energy beam during traversal from the retroreflector 60 to coating 32, and during traversal from the coating 32 to the detector 20, respectively. Hence, both the first and second optical paths traverse eight thicknesses of the beamsplitter substrate 31 and compensator plate 33. In the case of this beamsplitter conventionally wedged plates may be used with a wedged gap between them. This approach is particularly efficient for cancelling spurious reflections and is also advantageous because otherwise conventional interferometer components can be refitted for tilt compensation.

Figure 6:
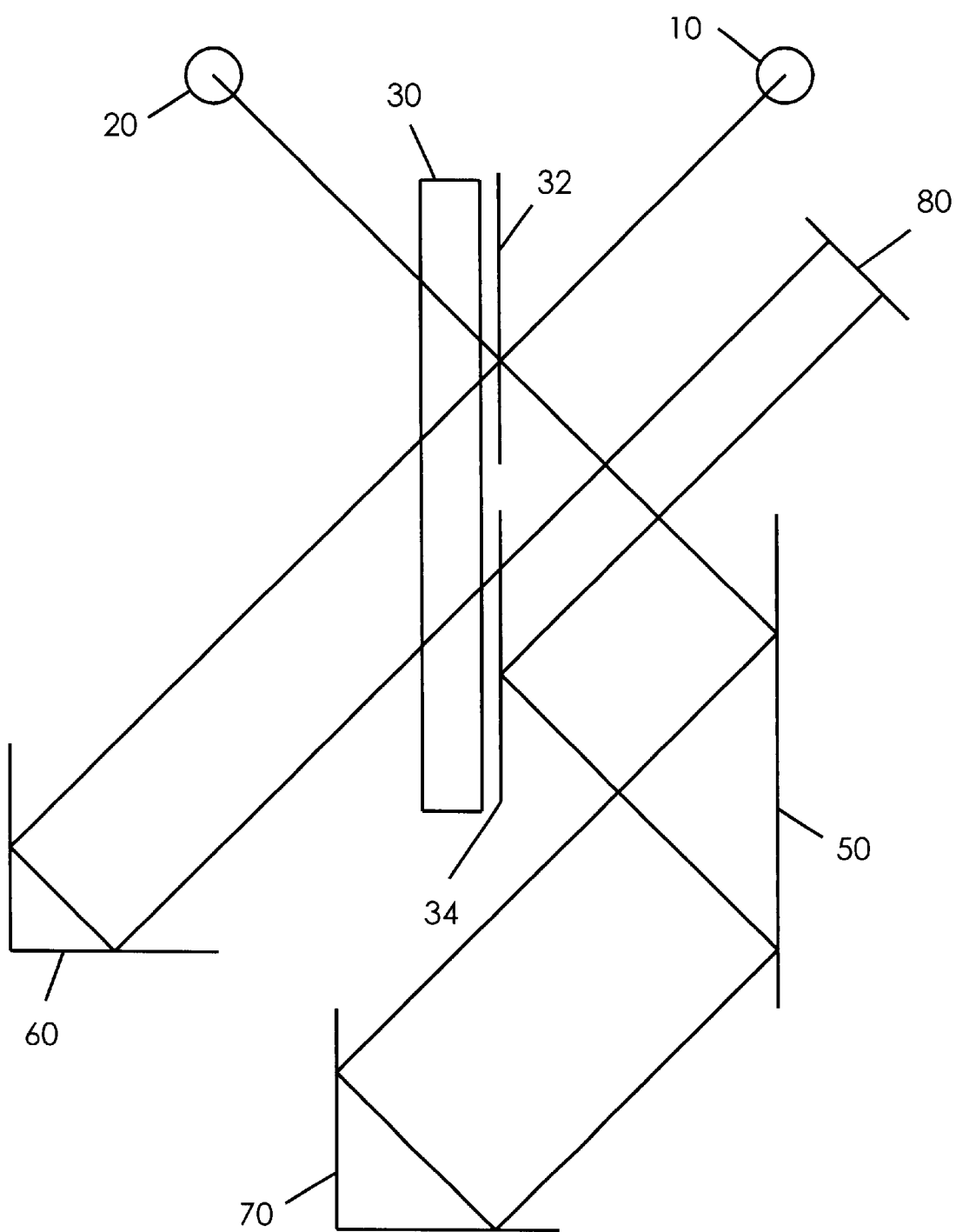
FIG. 6 is a diagram of a variation of the interferometer of FIG. 1 in which dispersion compensation is incomplete.
Figure 7:
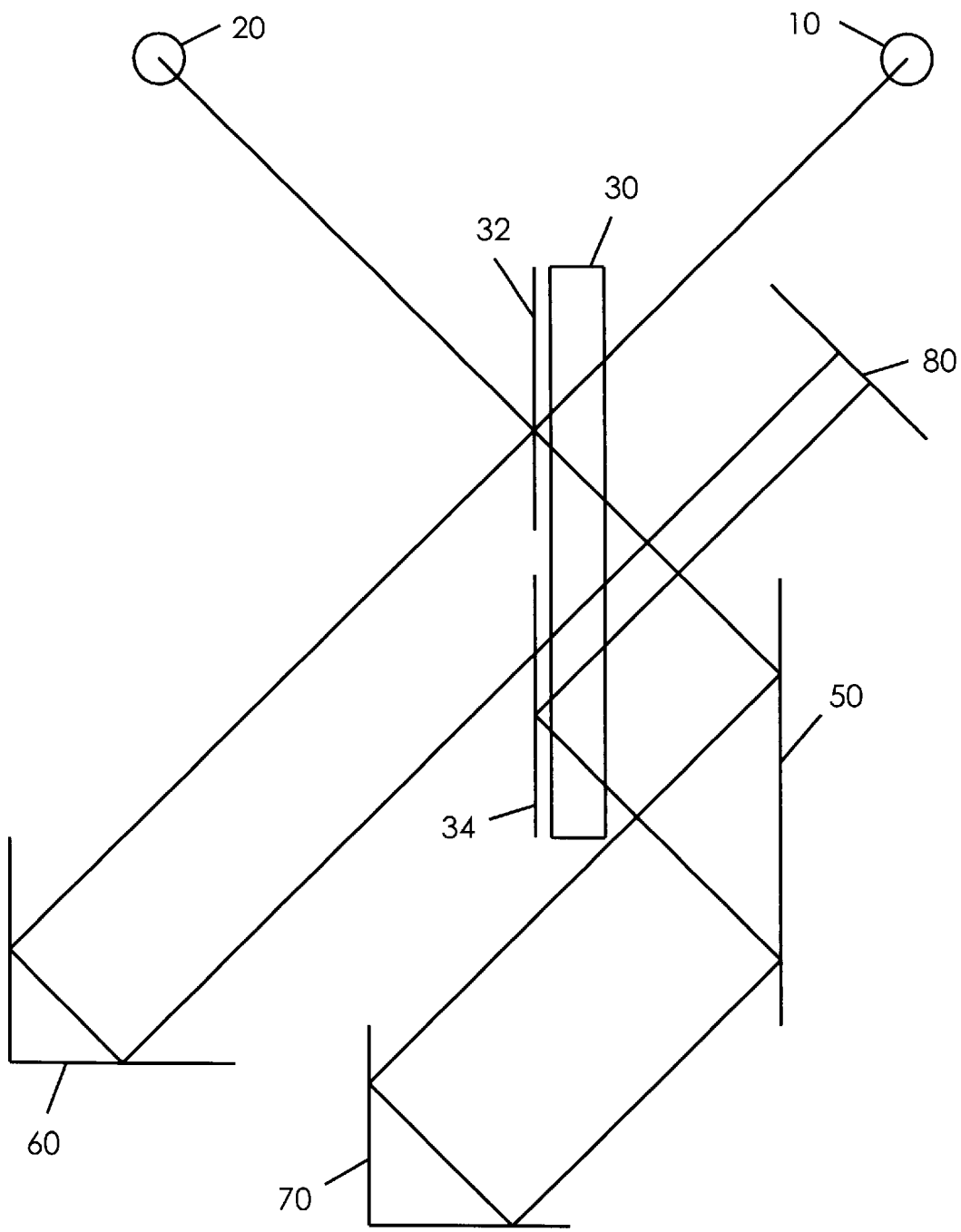
FIG. 7 is a diagram of a variation of the interferometer of FIG. 1 in which dispersion compensation is incomplete.

The interferometer arrangements shown in FIGS. 6 and 7 show related optics which produce less desirable results, although certain advantages accrue. In particular, only one side of the substrate need be polished to optical flatness and coated. In the case of 6 the coatings 32 and 34 are on the side of the beamsplitter substrate 30 closer to the source 10. The first energy beam while still a component of the primary energy beam makes only one pass through the substrate, then traverses the first optical path without making another pass through the substrate. The second energy beam traversing the second optical path makes three passes through the beamsplitter substrate 30. This assumes that the second energy beam does not pass through the substrate 30 during traversal between retroreflector 60 and reflector 80. This condition can be met by using the offset capability of the retroreflector 60 to displace the second energy beam far enough to pass by the substrate 30.

FIG. 7 shows a system in which both coatings are on the side of the substrate 30 further from the source 10. The consequence of this layout is that the first energy beam makes seven passes through the substrate while the second energy beam makes only three. The tally of three passes assumes that the second energy beam passes through the substrate in both directions while traversing between retroreflector 60 and reflector 80. While the retroreflector 60 could be arranged as in FIG. 6 to cause the second energy beam to pass by the substrate 30, this would result in only one pass through for the second energy beam. Hence, the difference between the number of passes through the substrate for the first and second optical paths would then be greater. That is, the first energy beam would still pass through seven thicknesses of the substrate 30, while the second energy beam would only pass through one thickness.

It is generally undesirable to have the beams in the two arms of an interferometer traverse different thicknesses of substrate and compensator material. Because of dispersion, the phase of each wavelength of radiation is retarded a different amount. The result is a chirped interference record. While the effect may be compensated by computation (see for example, Mattson, U.S. Pat. No. 5,491,551) it probably still compromises photometric accuracy.

The interferometers described above are insensitive to moderate misalignment of the components. The tilt compensation relies on the exact parallelism of the beams to and from the retroreflectors, which may be cube corner or cat's eye type. The internal alignment and perfection of the cube corner facets or of the component reflectors in the cat's eye partly govern the precision of the tilt compensation. The parallelism of the beamsplitter coatings 32 and 34, also affects the perfection of compensation. In practice, commercially available optical components can be obtained which have wavefront accuracy of lambda/10 and lambda/20 at visible wavelengths (lambda is used here to indicate wavelength). Such components are more than adequate for construction of interferometers to be used at infrared wavelengths.

FIGS. 8–20 disclose a number of variations on the interferometer class described relative to FIGS. 1, 3 through 5. The general concept is that flat reflectors may be interposed into the beams at various points, particularly between the beamsplitter 30 and the retroreflector 60 or between beamsplitter 30 and retroreflector 70. The disclosure of Manning (08/959,030) covers tilt compensated interferometers that use one flat moving mirror in either or both optical paths and is incorporated herein by reference. Tilt compensation is disclosed here as applying to a number of flat plates, which may include the beamsplitter, thereby expanding its utility. As before, it will be appreciated by those skilled in the art that the intrinsic tilt-compensation allows much freedom in choosing whether and how to translate, rotate or tilt the moving flat reflectors.

The collimated radiation from a source 10 is split by a beamsplitter 30 with an integral compensator plate (FIG. 1) or with a compensator plate (FIG. 5), or without a compensator plate (FIGS. 6 and 7). The transmitted second energy beam is reflected by a retroreflector 60 back through a transparent portion 36 of FIGS. 2g and 2h of the beamsplitter substrate 30 or of the compensator 31 and substrate 33. This is possible because the position of the retroreflector 60 in the transmitted arm (i.e., second optical path) may be adjusted to offset the second energy beam perpendicular to travel while preserving parallelism. The first energy beam that is reflected from the beamsplitter coating 32 passes to a second retroreflector 70. This beam is offset to a portion of the beamsplitter substrate that is coated 34 with gold or other reflective material. The reflection from this surface 34 is complementary with the reflection from the beamsplitting layer 32. Hence, the beam passing to the final flat reflector 80 is exactly parallel to the first energy beam, from mirror 50 of the first optical path, also arriving at the final reflector 80. Thus, the alignment of the reflector 80 that exactly returns one beam will exactly return the other. Slight alignment variations are completely compensated because both beams are returned to the same spots on the beamsplitter 30, 32, or 31, 32, and 33 and still recombine with optically perfect precision. In the case of moderate misalignment the beams would be off course to the detector 20. A detector focusing mirror would still focus them to the element with a small loss of energy. Advantages of this design and its variants include preservation of interferometric efficiency over a wide range of component misalignments. If there is a slight variation of source angle. 10 or beamsplitter 30 alignment, these are also compensated.

Figure 8:
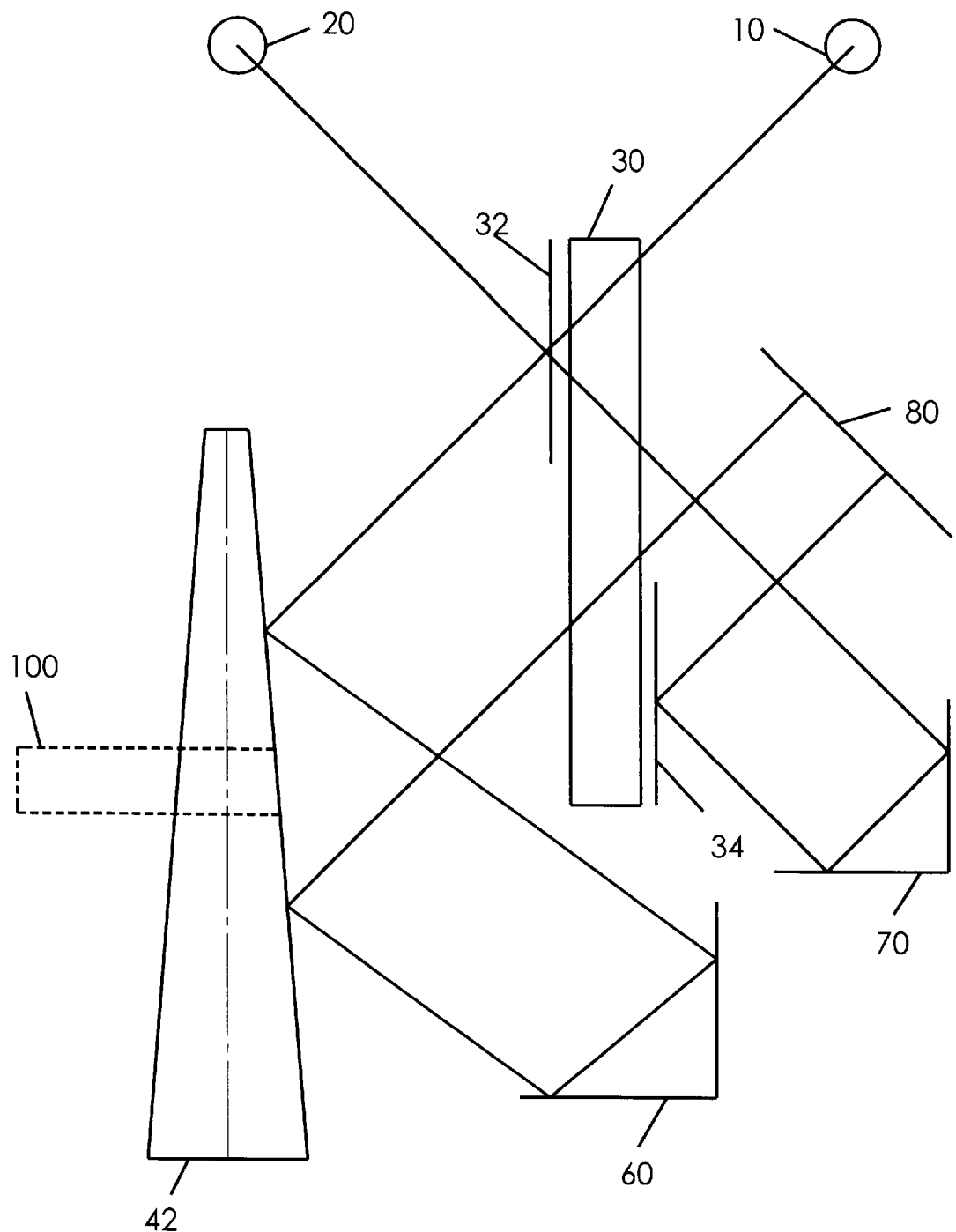
FIG. 8 is a diagram of an interferometer which uses a single rotating disk mirror to vary optical path difference. Tilt compensation is effected for both the beamsplitter and rotating disk mirror.

FIG. 8 shows an arrangement of a single doubly-wedged disk 42 in the second optical path of an interferometer of the present invention. The disk is fitted with a shaft 100 for rotation using ways that are known. The disk is understood to be the balanced, minimally distorting type disclosed previously. This interferometer also follows the previous disclosure but provides tilt-compensation of the beamsplitter 30 as described above. A second disk may be placed in the second optical path of the interferometer as in the previous disclosure. The rotation of the disks may be effected with a variable phase such that it is possible to electronically adjust the path difference of the interferometer. An interferometer of this type, having a fixed angle between the precessing mirror surface and rotation shaft 100, would usually have a fixed optical path difference or resolution. When the interferometer includes two such disks mounted on separate shafts it becomes possible to adjust the optical path difference from essentially zero to 2 times the optical path difference generated by each disk mirror 42 alone. This assumes that the tilt angle of both disk mirrors relative to the shaft is the same. If two disk mirrors 42 are formed with different tilt angles, then operation of the disks with variable rotation phase will lead to a different range of sums and differences for the optical retardation. For example, if the mirrors were operated with two different speeds differing by a factor of two, it would be possible to interleave high- and low-resolution scans. Another method for adjusting the optical path difference is to adjust the location where the beams impinge on the mirror surface. To a good approximation, the path difference introduced by a tilt mirror is equal to sine of the tilt angle times the distance between the pivot and the beam incidence times the number of beam passes divided by the sine of the average incidence angle. Hence, adjusting the position of the beam footprints relative to the axis of rotation provides a way for adjusting the exact path difference.

Figure 9:
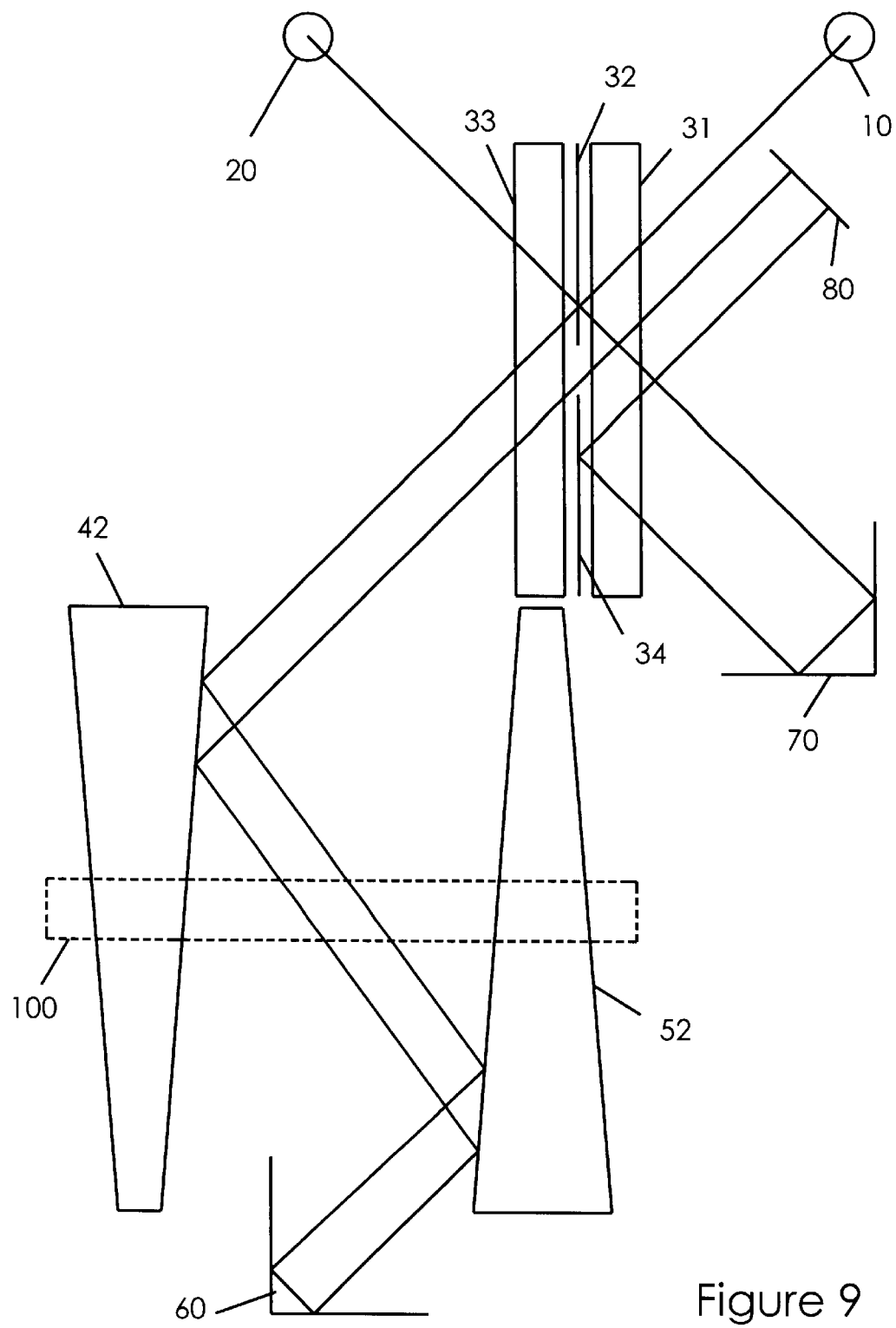
FIG. 9 is a diagram of an interferometer which uses the surfaces of two rotating disk mirrors to vary optical path difference. Tilt-compensation is effected for both the beamsplitter and the two disk mirrors.

Another variation of the class is shown in FIG. 9. This approach uses two disks 42 and 52 in the second optical path. The disks may be doubly wedged and intrinsically balanced for rotation as disclosed in the previous application. Thus, the disks may be rapidly rotated. The previous application did not include tilt compensation of multiple moving flat reflectors. Here the disks are also used with more complete tilt-compensation which includes the beamsplitter. The two disks 42 and 52 may be mounted on a common shaft, but need not be used with the more complete tilt compensation afforded by 30, 32, 34, 36, 60, 70 and 80. The two disks 42 and 52 need not be strictly parallel. Because the reflections are pairwise complementary, the tilt of the reflectors is still compensated correctly without strict parallelism.

As before all motions of all the optical components are compensated for tilt. Two more disks 42 and 52 may be added to the second arm of the interferometer to again double the path difference incurred as a consequence of rotation. The rotation phase between the two sets of disks may be adjusted to allow for a range of electronically adjustable optical path differences, if they are not all mounted on the same shaft. If the two disks in each arm are not mounted on a common shaft, then there are two additional degrees of freedom for electronically adjusting the optical path difference. If the mirror set in the second arm is rotated at three times the speed of the set in the first arm, then the optical path difference will be made somewhat more linear. If the rotation speed of the four mirrors can be independently adjusted, then the linearity of the variation of optical path difference can be improved further by operating each mirror at a different rotation speed. The set of rotation speeds will typically contain a series of odd multiples (1, 3, 5, 7), since the traditional optical path difference as a function of time is a simple triangle wave.

Figure 10:
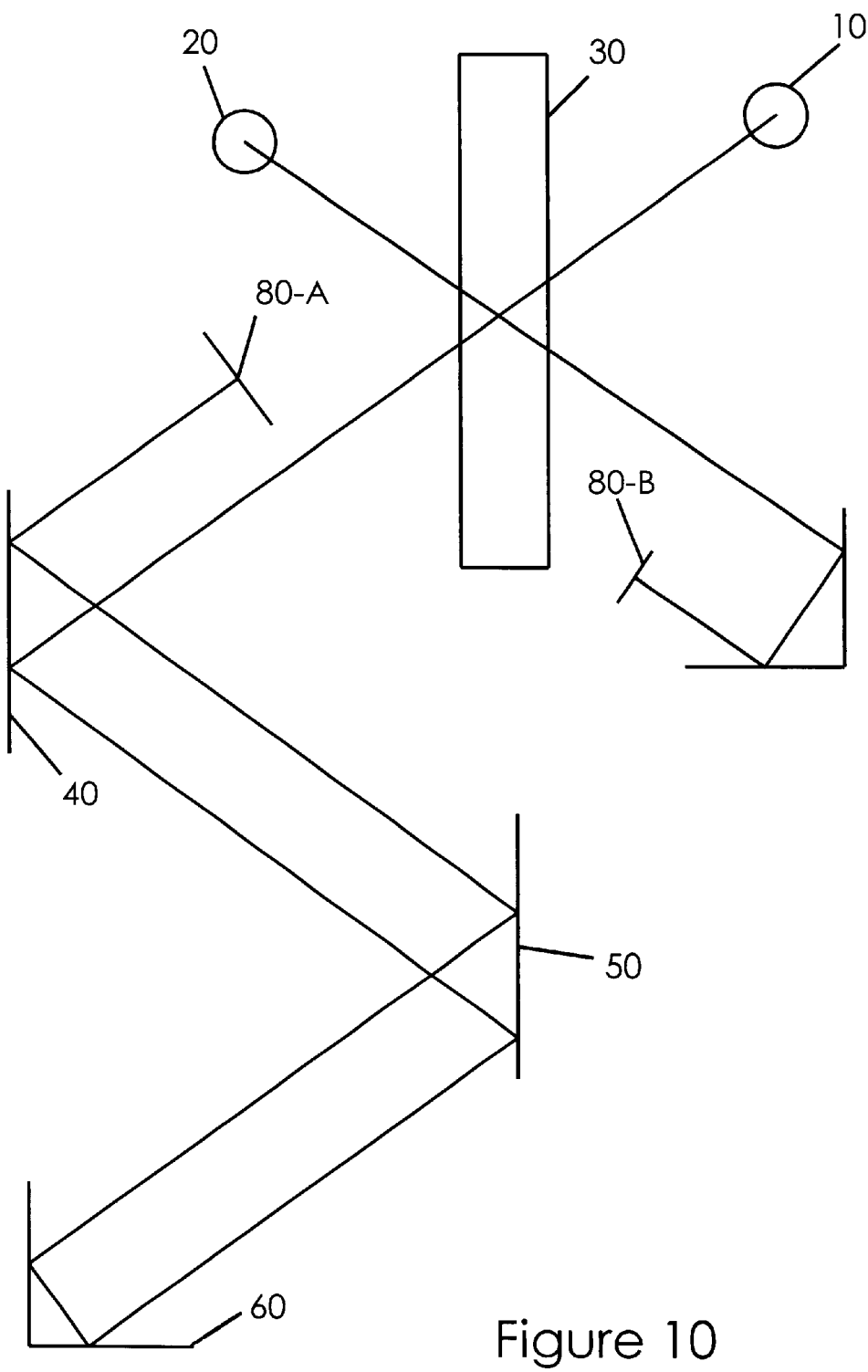
FIG. 10 is a diagram of an interferometer showing tilt-compensation of two planar mirrors.

Rather than having only one moving mirror as in the original patent disclosure, the design disclosed in FIG. 10 has two mirrors 40 and 50 which define a channel. The mirrors 40 and 50 can both be moved in a variety of motions without compromising optical alignment. It will be appreciated by those skilled in the art that a variety of motions of mirrors 40 and 50 will prove useful. Further, inadvertent motions of these components will have none or little effect on the interferometer alignment. One advantage is that the path difference can be doubled by moving both mirrors 40 and 50. The mirrors 40 and 50 may be moved in opposite directions to cancel the reaction force of acceleration. A disadvantage of having additional mirrors is that the overall length of the first and second optical paths is increased; this decreases the permissible throughput angle for a given aperture and possibly decreases the desired signal relative to a shorter interferometer. Moving mirrors 40 and 50 are shown in only the second optical path here but both the first and second optical paths may include either the same or different moving mirrors.

Figure 11:
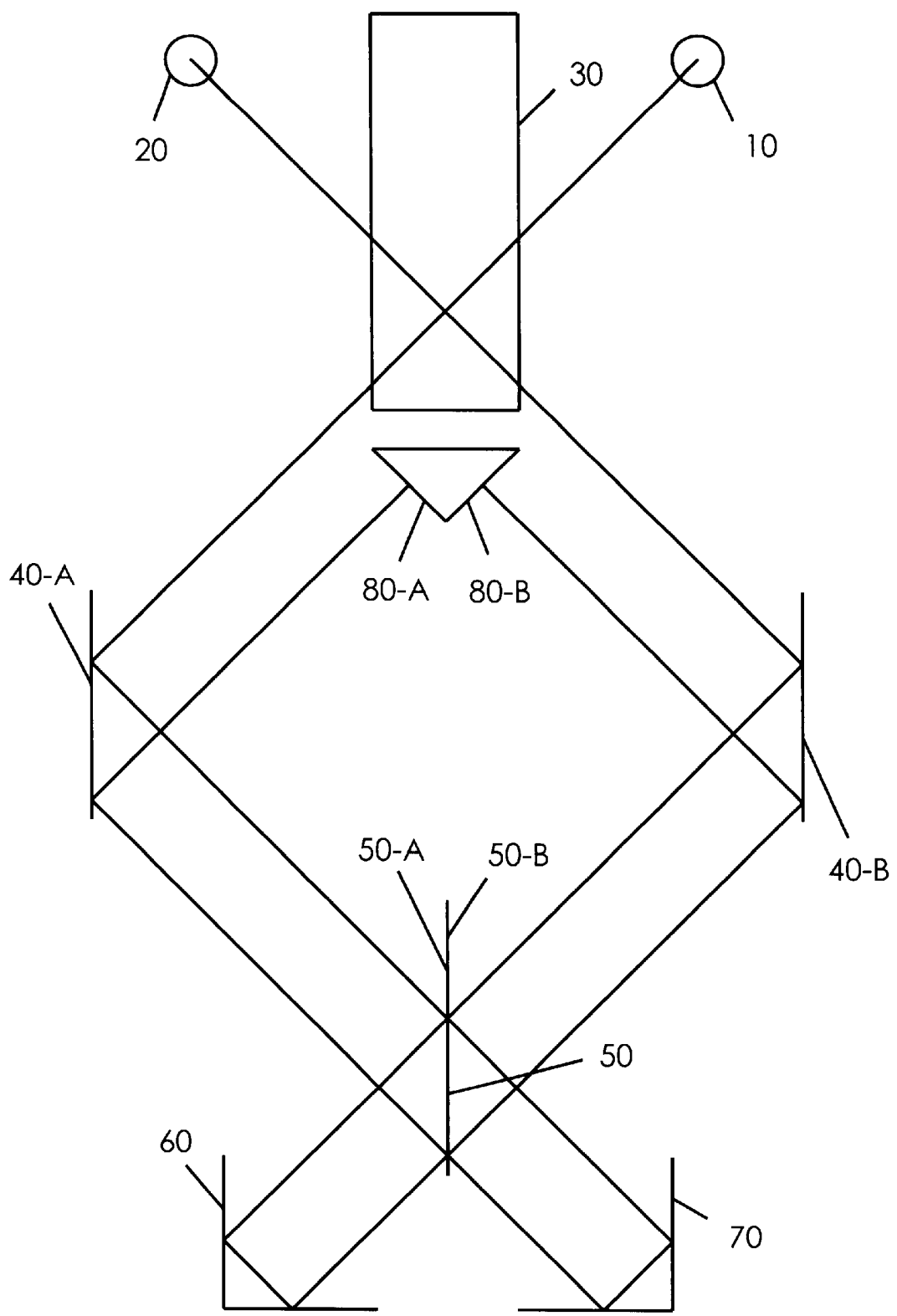
FIG. 11 is a diagram of an interferometer showing tilt-compensation of four planar mirrors, two of which comprised a double-sided reflector.

One advantageous arrangement diagrammed in FIG. 11 shows another interferometer of the class using the two sides 50A and 50B of a single moving mirror 50 to achieve an increase in length of the first optical path while the length of the second optical path is decreased. The two mirrors 40A and 40B define the channels around 50. All three mirrors 40A, 40B and 50 may be moved; further they may be moved in such a manner to as to cancel reaction forces. This would involve both mirrors 40 moving in the same general direction while 50 moves in the opposite direction. Such motions can be arranged by a variety of known methods. The mirror 50 may also be simply tilted or translated. The reflectors 80A and 80B in this diagram should be understood to be mutually perpendicular. Interferometers that incorporate such a mirror are known in the art.

Figure 12:
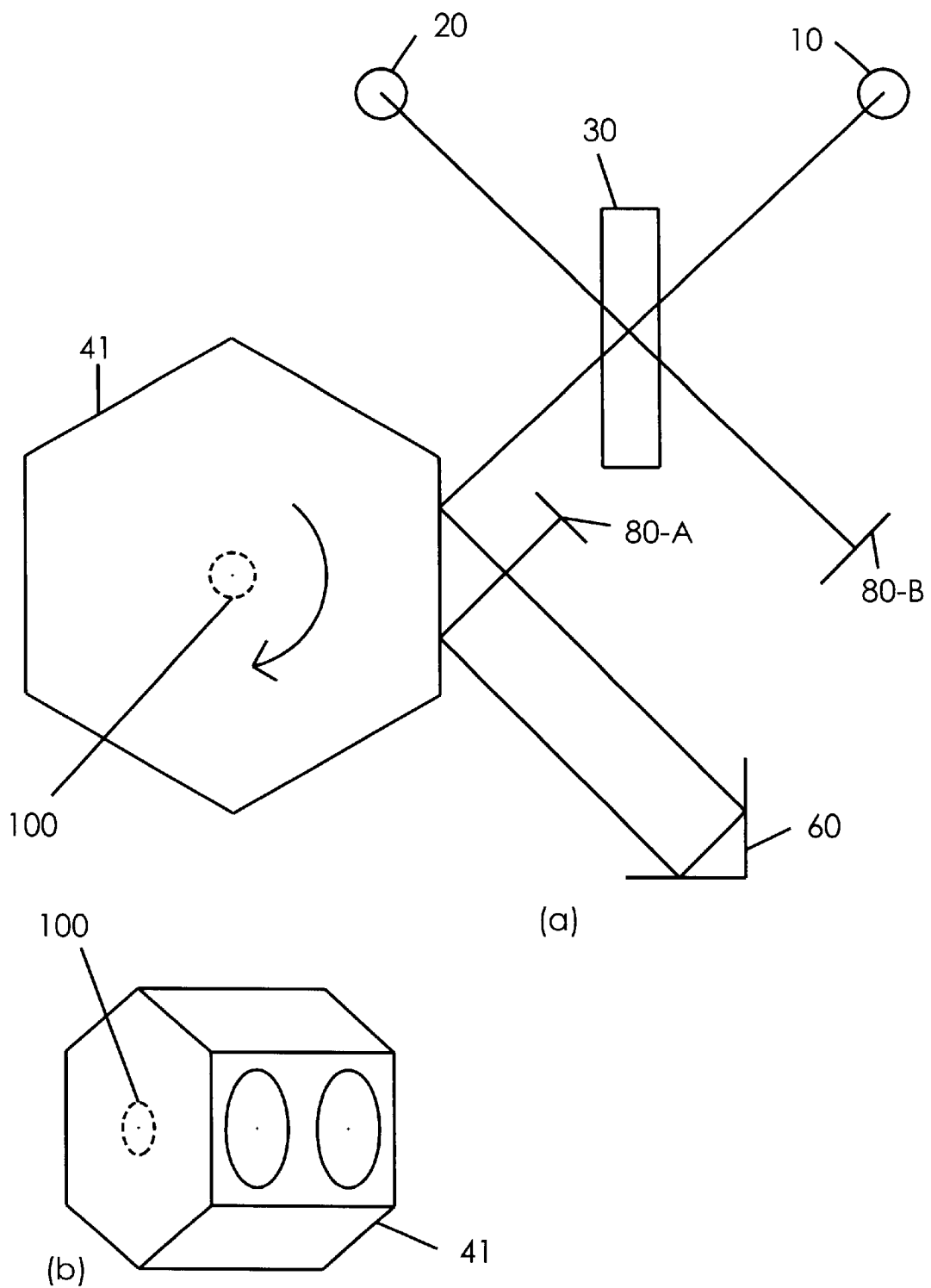
FIG. 12 is a diagram of an interferometer which uses a rotating polygon mirror to vary optical path difference.

The interferometer variation shown in FIG. 12a uses a polygon mirror 41 to obtain n interferograms per revolution. The value of n is determined by the number of facets on the polygon mirror 41 which in the example case is 6. If the optical path difference is arranged to vary symmetrically about zero as the beams pass across each facet, then effectively 2n scans may be obtained per revolution, but each scan will have only half of the total optical path difference generated by the scanning of each facet. The theory of operation is the same as before: the variation of distance between the reflective surface of the polygon and the other optical components, particularly the mirrors 80A, the retroreflector 60 and the beamsplitter 30, cause variation of path difference between the first and second optical paths when the polygon mirror 41 is rotated. The beamsplitter shown in FIG. 12 is conventional in the sense that it does not contain a reflector 34 described relative to FIG. 1. The same beamsplitter tilt-compensation could be used with the scanning apparatus exemplified in FIG. 12, but has been omitted to make clear that it is an optional component of the present invention. It extends the utility of the present invention by allowing interferometers to be constructed such that they need only be aligned coarsely. The fine alignment usually practiced with interferometers is intrinsic to the optics when the beamsplitter and the moving planar reflectors are tilt-compensated.

A detail of one arrangement of beam footprints on the facets of the polygon mirror 41 is shown in FIG. 12b. As before, the complementary reflections cancel the angular variation that normally accompanies the use of tilting reflectors. A disadvantage of this design is that the discontinuities of the mirror facets lead to temporary decrease of signal when the beams pass from one facet to the next. Thus, the duty cycle efficiency may be less than desired. The disadvantage is more severe if there are more discontinuities, i.e., more facets. The larger the facets are, the smaller the impact on duty cycle efficiency. Of course, larger facets imply a larger polygon mirror which increases the difficulty of spinning rapidly. A second polygon mirror may be used in the first optical path to increase the total optical path difference.

Figure 13:
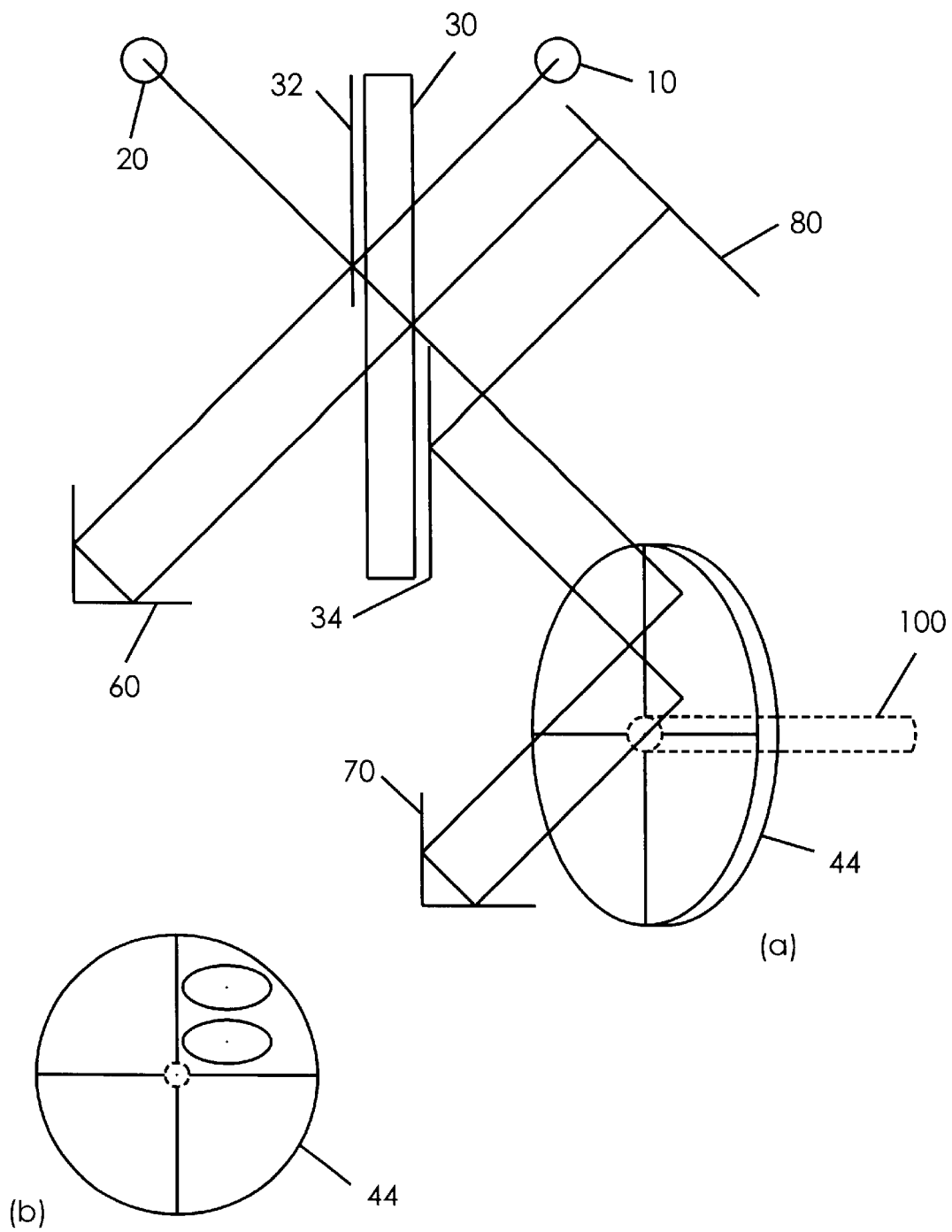
FIG. 13 is a diagram of an interferometer which uses a single rotating disk mirror to scan optical path difference. The disk mirror has multiple facets.
Figure 14:
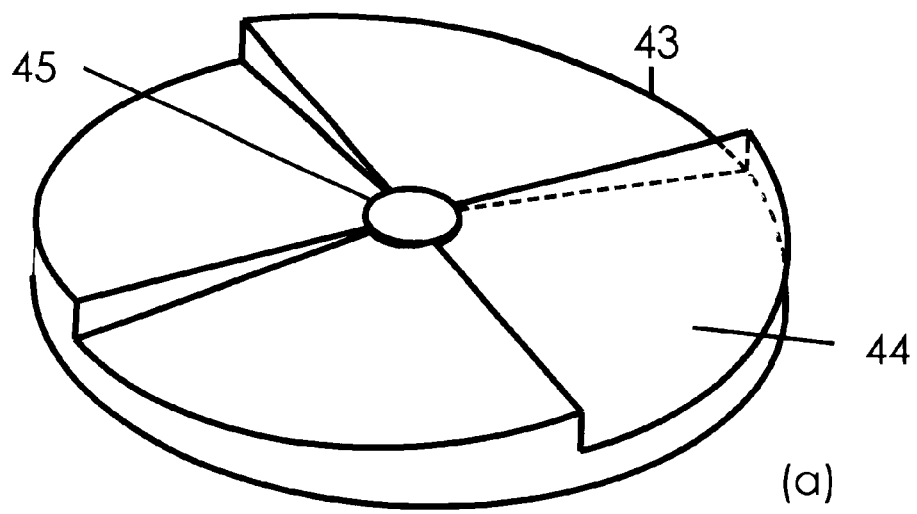
FIG. 14 is a diagram of the disk mirror of FIG. 12.
Figure 14:
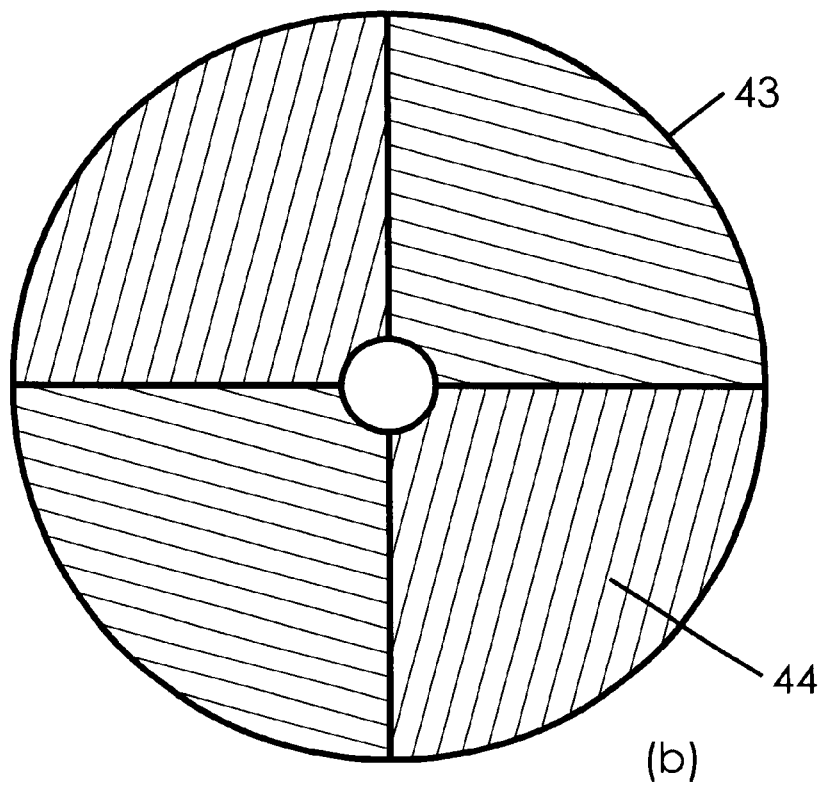

FIG. 13 shows a variation of the interferometer class that uses a multi-faceted flat mirror 44. This mirror operates in analogy to the rotating polygon of FIG. 12. In particular, the number of scans of optical path difference is equal to the number of facets. The number of facets need not be 4. As before complementary reflections at the mirror 41 compensate for tilt. A detail of one arrangement of beam footprints on the facets is shown in FIG. 13b. The structure of the flat multi-faceted mirror is shown in FIG. 14. The facets 44 are optically flat to the precision required for interferometer construction in the wavelength range of interest. A mounting location 45 is provided so that the assembly may be easily attached to a shaft for rotation. This arrangement suffers the same disadvantage of duty cycle efficiency that is mentioned relative to FIG. 12. A larger number of facets results in more discontinuities per revolution.

Figure 15:
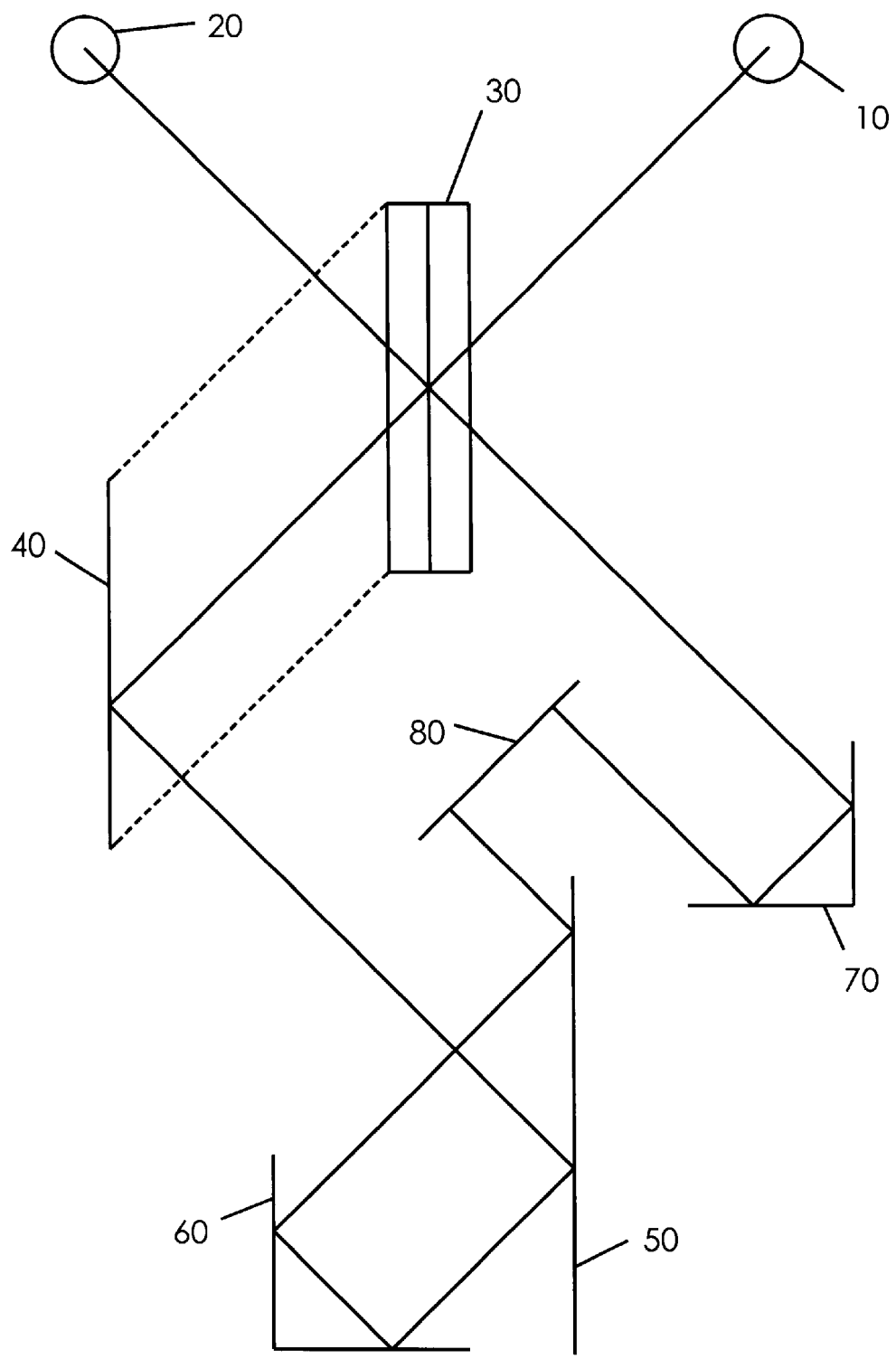
FIG. 15 is a diagram of an interferometer incorporating a parallel reflector to produce two parallel beams; the optical path difference is scanned by a planar moving mirror.
Figure 16:
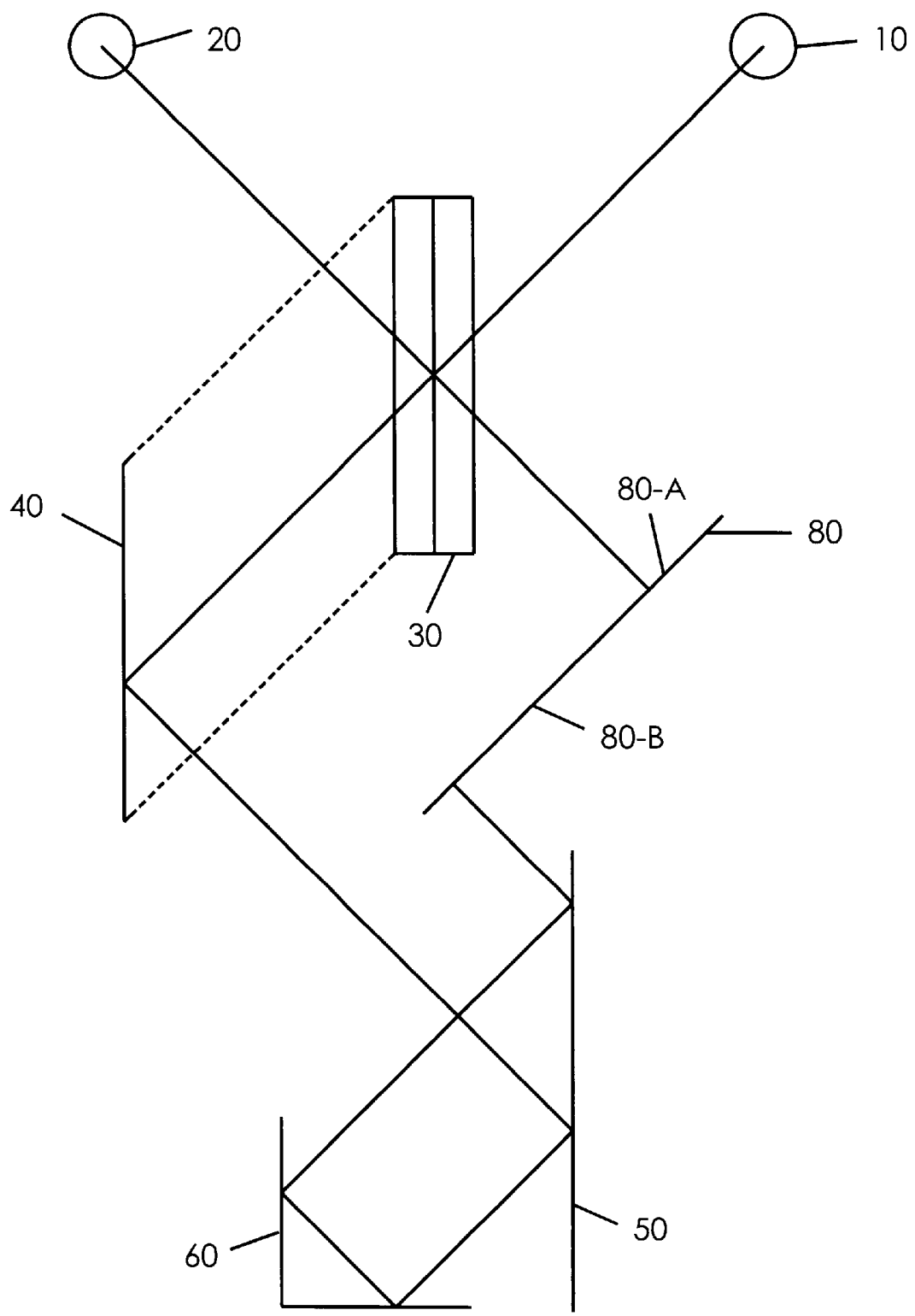
FIG. 16 is a diagram of a variation of the interferometer of FIG. 15.

FIGS. 15 and 16 show two more interferometers of the class. In these two embodiments the beamsplitter contains a parallel reflector assembly including mirror 40. A beamsplitter of this general type is known. The first and second energy beams are very accurately parallel as a result of one reflecting from the mirror 40 which is parallel to the beamsplitting coating 32. The present invention may be applied as shown in FIGS. 15 and 16 to scan the optical path difference while maintaining the intrinsic tilt-compensation of the beamsplitter afforded by the inventions of Solomon and Turner. Accordingly, a flat moving mirror 50 has been included in both diagrams. In FIG. 15, the second energy beam makes two complementary reflections at the flat mirror 50 such that the second energy beam propagating to reflector 80 is exactly parallel to the first energy beam propagating to reflector 80 via retroreflector 70. As before, tilt of all components in the system is compensated. The optical path difference can be scanned by a variety of motions of mirror 50.

In FIG. 16, the first energy beam propagating from the beamsplitter 30 to the side 80A of double-sided reflector 80 is intrinsically antiparallel to the second energy beam which is propagating to side 80B of this reflector. The second energy beam after reflecting from mirror 40 passes to mirror 50 where it makes the first of a pair of complementary reflections. It then passes to retroreflector 60 where it is inverted, offset and returned to mirror 50. As was the case in FIG. 1, the mirror 50 may be scanned in a variety of motions including tilt, shear, translation and nutation or precession. After a second reflection from mirror 50, the second energy beam is exactly antiparallel to the first energy beam such that any tilt of mirror 80 will affect both beams equally. It will be appreciated that mirror 80 can also be scanned in a variety of motions.

Figure 17:
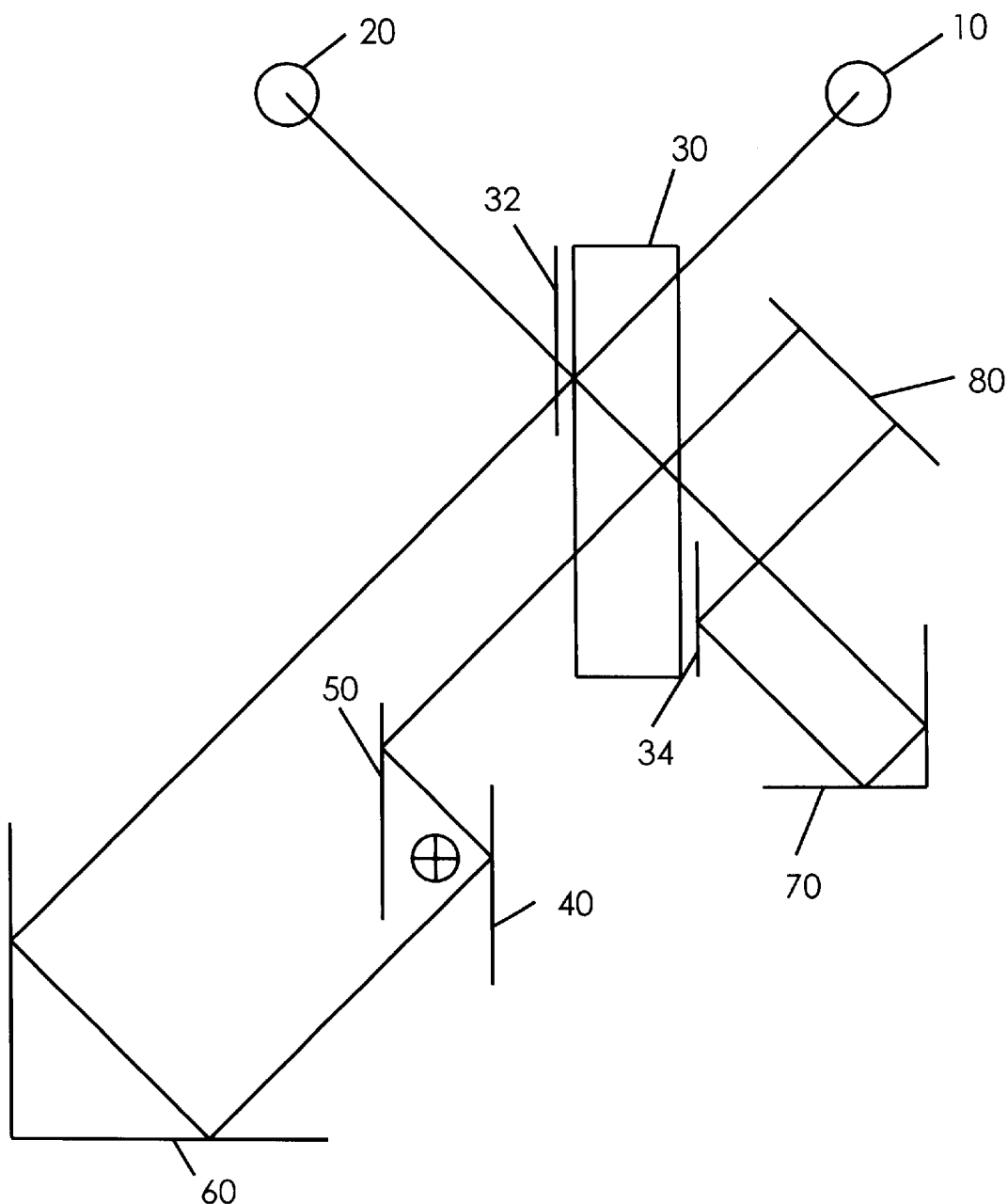
FIG. 17 is a diagram of a variation of the interferometer of FIG. 1. The optical path difference is varied by two approximately parallel reflectors mounted on a tilt platform.

FIG. 17 shows an interferometer in which the reflections at mirrors 40 and 50 are complementary because the two mirrors are aligned exactly parallel. This follows other methods in that the two reflections at 40 and 50 are pairwise complementary. Thus, the tilt-compensation mechanism applied to mirrors 40 and 50 of FIG. 10 is unnecessary. This approach also follows other methods in that the assembly supporting 40 and 50 is intended to allow optical path difference scanning by tilt. The beamsplitter 30 together with retroreflectors 60 and 70 comprise a parallel reflector assembly. Hence, a parallel reflector assembly may be used with this optical mechanism to produce a permanently aligned interferometer.

Figure 18:
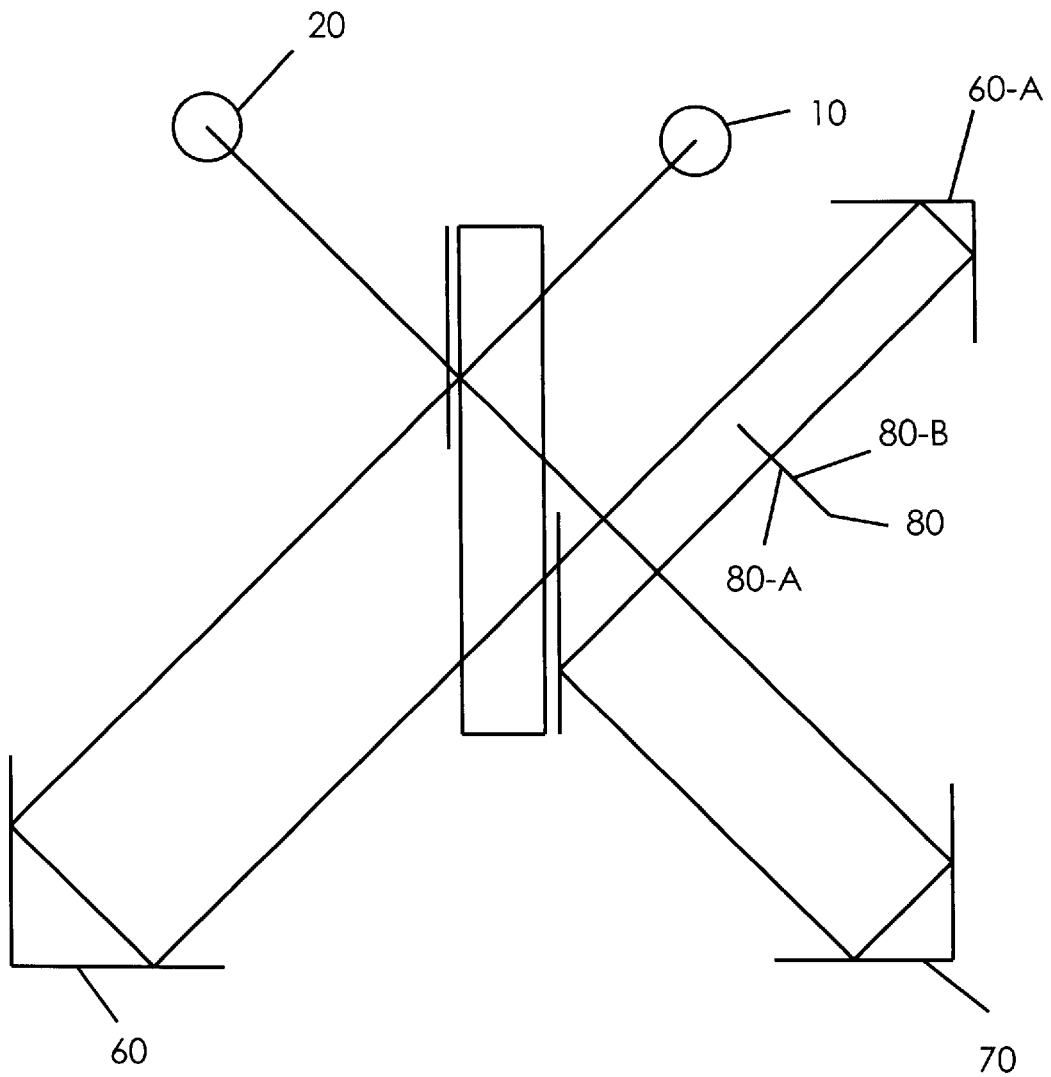
FIG. 18 is a diagram of an interferometer which uses three retroreflectors to produce tilt-compensation for the beamsplitter and a double-sided flat reflector.

FIG. 18 shows an alternate embodiment. In this case the system of the beamsplitter 30 together with retroreflectors 60 and 70 comprise a parallel reflector assembly analogous to other systems. Adding a third retroreflector can form antiparallel beams propagating to the two sides of mirror 80. The tilt of a single, moving, flat, double-sided reflector 80 is compensated by the present invention. The first optical path of the interferometer is from the beamsplitter coating 32 to retroreflector 70 thence to reflecting surface 34 of the beamsplitter and to the side 80A of the flat double-sided reflector 80. The second optical path is from the beamsplitter coating 32 through to retroreflector 60, passing through the beamsplitter substrate to retroreflector 60A, then to the side 80B of reflector 80.

Figure 19:
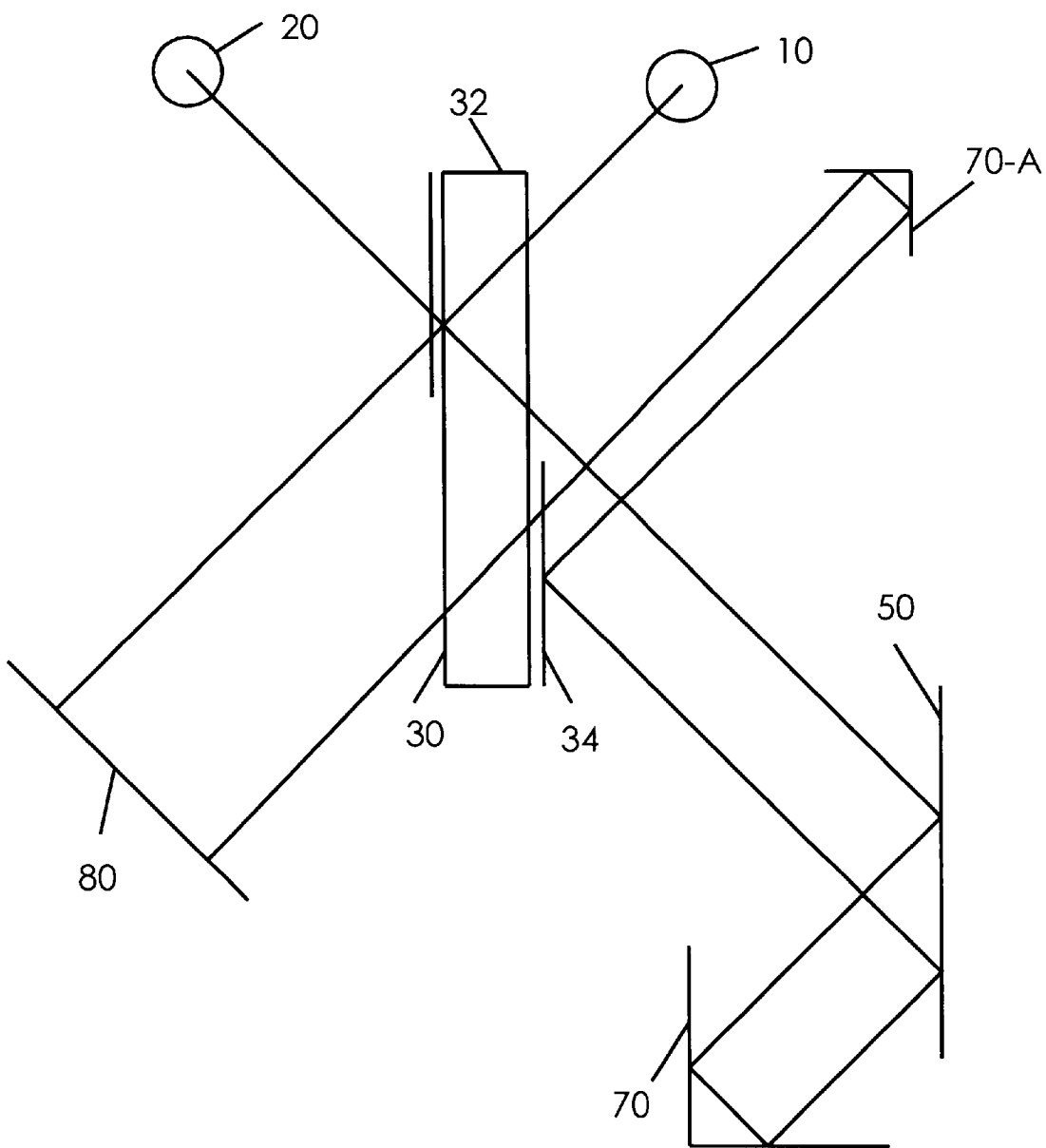
FIG. 19 is a variation of the interferometer of FIG. 1 in which two retroreflectors are in the same optical path.

FIG. 19 shows a variation of the interferometer of FIG. 1 in which both retroreflectors have been placed in the first optical path. The result is another parallel beamsplitter and reflector assembly analogous to other systems. In this case, the optical path difference scanning is provided by a moving mirror 50 in the first optical path. The second optical path comprises only reflector 80, but as before, the tilt of reflector 80 is compensated.

Figure 20:
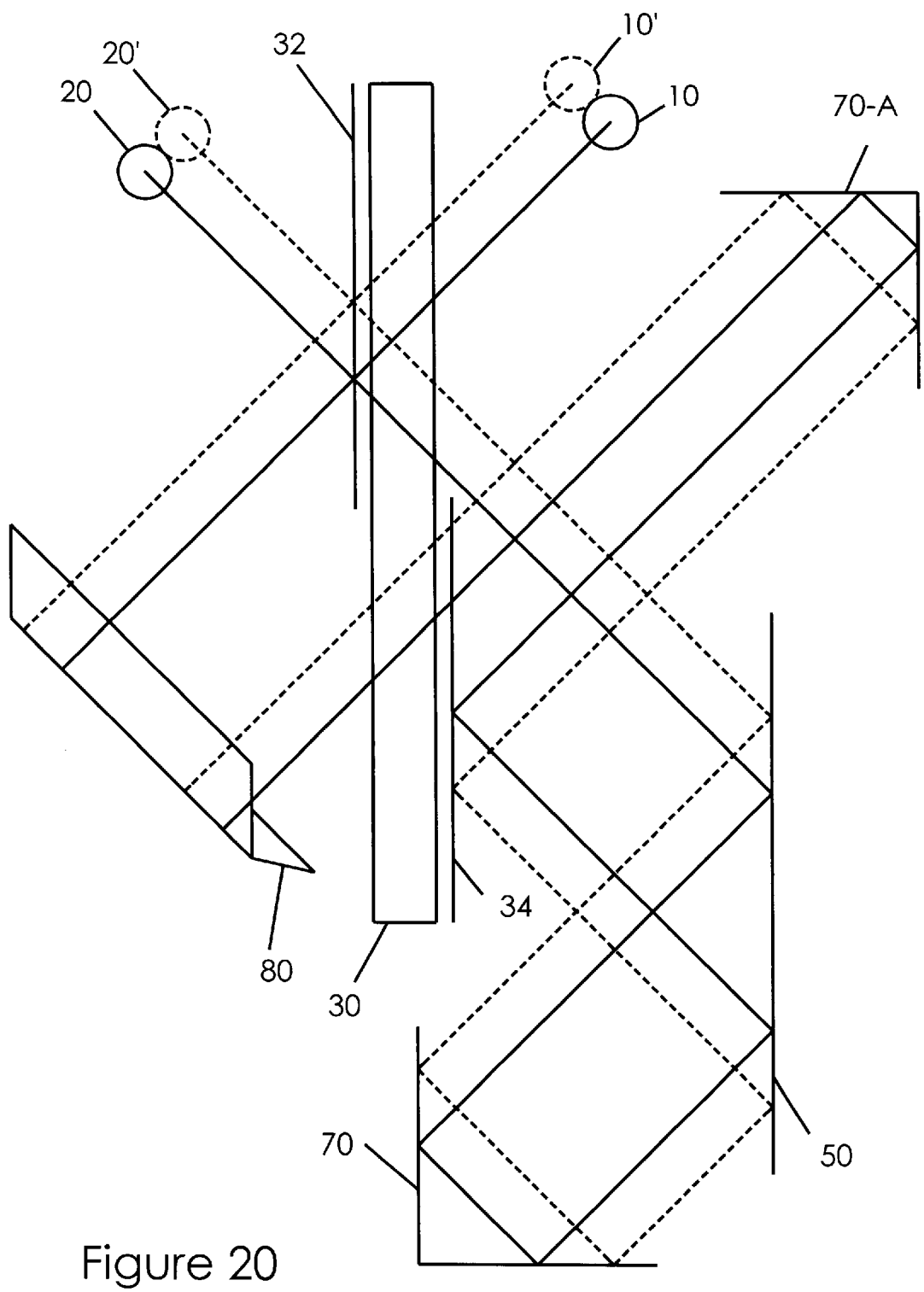
FIG. 20 is a variation of the interferometer of FIG. 19 in which the final mirror is a roof reflector. The result can be a four-port interferometer.

FIG. 20 shows a variation of the interferometer of FIG. 19 in which the return reflector 80 is a roof reflector. A roof reflector has two internal facets oriented perpendicular to each other. The effect of the roof reflector is to convert the interferometer to a four-beam interferometer. The dashed line indicates that an exactly parallel beam is displaced in one axis from the beam. Two additional ports indicated by 10' and 20' are formed. These ports may be used advantageously for known purposes which may include emission measurements or optical subtraction. Replacement of a flat return reflector 80 in any of the embodiments diagrammed herein will convert that interferometer to a four port design. Compensation for tilt and shear of return reflector 80 is preserved with one exception; the interferometer thus formed becomes sensitive to rotation of 80 about axes parallel to the incident beams. Known ways to mount and adjust a roof reflector 80 can be used to minimize the sensitivity to disturbance. The return reflector 80 may be comprised of two separate roof reflectors, with the disadvantage that several axes of intrinsic tilt and shear compensation will be lost.

The principles, embodiments and modes of operation of the present invention have been set forth in the foregoing provisional specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

I claim:

1. A spectrometer, comprising:
    a source of a primary beam of radiant energy;
    a beamsplitter, fixed relative to the primary beam, the beamsplitter dividing the primary beam into at least a first energy beam and a second energy beam, the first energy beam traversing at least a first optical path, the second energy beam traversing at least a second optical path, the beamsplitter containing an uncoated portion through which at least one optical path passes;
    at least a first reflector, the first reflector positioned so as to reflect the first energy beam back to at least the beamsplitter;
    at least a second reflector, the second reflector being moveable with respect to the primary beam and positioned to receive the second energy beam for at least a first reflection, a second reflection, a third reflection, and a fourth reflection;
    at least a first retroreflector, the first retroreflector positioned to receive the first reflection of the second energy beam from at least the second reflector, the first retroreflector returning the second energy beam to at least the second reflector for the second reflection;
    at least a third reflector, the third reflector positioned so as to receive the second reflection of second energy beam from at least the second reflector and to return the second energy beam to at least the second reflector for the third reflection of the second energy beam, at least a first portion of the second optical path that is traversed by the second energy beam from the second reflector to the third reflector being antiparallel to at least a second portion of the second optical path traversed by the second energy beam from at least the third reflector to the second reflector;
    the second reflector returning the third reflection of the second energy beam to at least the first retroreflector;
    the first retroreflector returning the second energy beam to at least the second reflector for the fourth reflection of the second energy beam;
    the second reflector returning the second energy beam to the beamsplitter, the returned second energy beam being in reverse order and in an inverted state to make the returned second energy beam complementary with at least the portion of the second energy beam traversing a path from the beamsplitter to at least the second reflector; and
    the beamsplitter combining at least portions of the first and second energy beams and transmitting the combined portions of the first and second energy beams to a detector.

2. A spectrometer as claimed in claim 1, wherein a second retroreflector is used to invert an energy beam.

3. A spectrometer as claimed in claim 1, wherein the first and second optical paths share at least a portion of the third reflector.

4. A spectrometer as claimed in claim 1, further including a fourth reflector, the fourth reflector having at least a fourth reflective planar optical surface mounted thereon.

5. A spectrometer as claimed in claim 1, further including at least a first rotating disk mirror in at least one optical path.

6. A spectrometer as claimed in claim 1, wherein the first reflector is a roof reflector.

7. A spectrometer as claimed in claim 1, wherein the second reflector is a roof reflector.

8. A spectrometer as claimed in claim 1, wherein the first and second optical paths pass through a substantial equal thickness of optical material.

9. A spectrometer, comprising:
    a source of a primary beam of radiant energy;
    a beamsplitter, fixed relative to the primary beam, the beamsplitter dividing the primary beam into at least a first energy beam and a second energy beam, the first energy beam traversing at least a first optical path, the second energy beam traversing at least a second optical path;
    at least a first reflector, the first reflector having at least a first primary reflective planar optical surface mounted to reflect the first energy beam back to the beamsplitter, at least a first portion of the first optical path that is traversed by the first energy beam from the first reflector to the beamsplitter being antiparallel to at least a second portion of the first optical path traversed by the first energy beam from at least the beamsplitter to the first reflector;
    at least a second reflector, the second reflector being a polygon that is moveable with respect to the primary beam and having at least first, second, and third secondary reflective planar optical surfaces mounted thereon so that the second reflector may be moved to allow at least two secondary reflective planar optical surfaces to sequentially receive the second energy beam, the secondary reflective planar optical surface that is currently receiving the second energy beam becoming a currently active second reflector surface, the currently active second reflector surface producing at least a first reflection, a second reflection, a third reflection, and a fourth reflection;
    at least a first retroreflector, the first retroreflector positioned to receive the first reflection of the second energy beam from at least the currently active second reflector surface, the first retroreflector returning the second energy beam to at least the currently active second reflector surface for the second reflection;
    at least a third reflector, the third reflector having at least a first tertiary reflective planar optical surface mounted to receive the second reflection of second energy beam from at least the currently active second reflector surface and to return the second energy beam to at least the currently active second reflector surface for the third reflection of the second energy beam, at least a first portion of the second optical path that is traversed by the second energy beam from the currently active second reflector surface to at least the first tertiary reflective planar optical surface being antiparallel to at least a second portion of the second optical path that is traversed by the second energy beam from at least the first tertiary reflective planar optical surface to the currently active second reflector surface;

the currently active second reflector surface returning the third reflection of the second energy beam to at least the first retroreflector;

the first retroreflector returning the second energy beam to at least the currently active second reflector surface for the fourth reflection of the second energy beam;

the currently active second reflector surface returning the fourth reflection of the second energy beam to the beamsplitter, the returned second energy beam being in reverse order and in an inverted state to make the returned second energy beam complementary with at least the portion of the second energy beam traversing a path from the beamsplitter to at least the currently active second reflector surface; and the beamsplitter combining at least portions of the first and second energy beams and transmitting the combined portions of the first and second energy beams to a detector.

10. A spectrometer, comprising:

a source of a primary beam of radiant energy;

a beamsplitter, fixed relative to the primary beam, the beamsplitter including a parallel reflector assembly, the beamsplitter dividing the primary beam into at least a first energy beam and a second energy beam, the first energy beam traversing at least a first optical path, the second energy beam being reflected by the parallel reflector assembly and traversing at least a second optical path;

a first reflector, the first reflector positioned to receive the first energy beam from at least the beamsplitter and to return the first energy beam to at least the beamsplitter, at least a first portion of the first optical path that is traversed by the first energy beam from the first reflector to the beamsplitter being antiparallel to at least a second portion of the first optical path traversed by the first energy beam from at least the beamsplitter to the first reflector;

a second reflector, the second reflector being moveable with respect to the primary beam and positioned to receive the second energy beam for at least a first reflection, a second reflection, a third reflection, and a fourth reflection;

a first retroreflector, the first retroreflector positioned to receive the first reflection of the second energy beam from at least the second reflector, the first retroreflector returning the second energy beam to at least the second reflector for the second reflection, the second reflection of the second energy beam being received by the first reflector and returned to the second reflector for the third reflection, at least a first portion of the second optical path that is traversed by the second energy beam from the second reflector to the first reflector being antiparallel to at least a second portion of the second optical path traversed by the second energy beam from at least the first reflector to the second reflector;

the second reflector returning the third reflection of the second energy beam to at least the first retroreflector;

the first retroreflector returning the second energy beam to at least the second reflector for the fourth reflection of the second energy beam;

the second reflector returning the second energy beam to the beamsplitter by way of the parallel reflector assembly, the returned second energy beam being in reverse order and in an inverted state to make the returned second energy beam complementary with at least the portion of the second energy beam traversing a path from the beamsplitter to at least the second reflector; and the beamsplitter combining at least portions of the first and second energy beams and transmitting the combined portions of the first and second energy beams to a detector.

11. A spectrometer as claimed in claim 10, including at least a second retroreflector, the second retroreflector positioned to receive the first energy beam from the beamsplitter, to reflect the first energy beam to the first reflector, to receive a return reflection of the first energy beam from the first reflector, and to return the first energy beam to the beamsplitter.

12. A spectrometer, comprising:

a source of a primary beam of radiant energy;

a beamsplitter, fixed relative to the primary beam, the beamsplitter dividing the primary beam into at least a first energy beam and a second energy beam, the first energy beam traversing at least a first optical path, the second energy beam traversing at least a second optical path;

a first retroreflector, the first retroreflector positioned to receive the first energy beam;

a first reflector, the first reflector being a reflective planar optical surface, the first reflector positioned to receive the first energy beam from at least the first retroreflector and to return the first energy beam to at least the first retroreflector, at least a first portion of the first optical path that is traversed by the first energy beam from the first reflector to at least the first retroreflector being antiparallel to at least a second portion of the first optical path- traversed by the first energy beam from the first retroreflector to at least the first reflector;

a second reflector, the second reflector being a reflective optical surface, the second reflector being moveable with respect to the primary beam and positioned so as to receive the second energy beam for at least a first reflection;

a third reflector, the third reflector being a reflective optical surface, the third reflector being moveable with respect to the primary beam and positioned to receive the second energy beam for at least a second reflection, the third reflector positioned to receive the first reflection from the second reflector for the second reflection;

a second retroreflector, the second retroreflector positioned to receive the second reflection from at least the third reflector, the second retroreflector returning the second energy beam to at least the third reflector for a third reflection, the third reflection being received by the second reflector for a fourth reflection, the fourth reflection being received by at least the first reflector and returned to the second reflector for a fifth reflection, at least a first portion of the second optical path that is traversed by the second energy beam from the second reflector to the first reflector being antiparallel to at least a second portion of the second optical path traversed by the second energy beam from at least the first reflector to the second reflector;

the third reflector receiving the fifth reflection from at least the second reflector for a sixth reflection, the second retroreflector receiving the sixth reflection from at least the third reflector, the second retroreflector returning the second energy beam to the at least the third reflector for a seventh reflection;

the second reflector receiving the seventh reflection from at least the third reflector for an eighth reflection;

the beamsplitter receiving the eighth reflection from at least the second reflector, the returned second energy beam being in reverse order and in an inverted state to make the returned second energy beam complementary with at least the portion of the second energy beam traversing a path from the beamsplitter to at least the second reflector; and the beamsplitter combining at least portions of the first and second energy beams and transmitting the combined portions of the first and second energy beams to a detector.

13. A spectrometer as claimed in claim 12 wherein the second energy beam passes through a non-reflective portion of the beamsplitter on an optical path between the first reflector and the second reflector.

14. A spectrometer as claimed in claim 12, wherein a portion of the beamsplitter is fully reflective.

15. A spectrometer as claimed in claim 12, wherein the first energy beam is reflected between the first retroreflector and the first reflector by way of the beamsplitter.

16. A spectrometer as claimed in claim 12, wherein the second reflector is a rotating disk.

17. A spectrometer as claimed in claim 16, wherein the second reflector is doubly wedged.

18. A spectrometer as claimed in claim 12, wherein the third reflector is a rotating disk.

19. A spectrometer as claimed in claim 18, wherein the third reflector is doubly wedged.

20. A spectrometer as claimed in claim 12, wherein the second and third reflectors are doubly-wedged rotating disks mounted on a common shaft.

21. A spectrometer as claimed in claim 12, wherein the second and third reflectors are doubly-wedged rotating disks, the second reflector mounted on a first shaft and the second reflector mounted on a second shaft.

22. A spectrometer as claimed in claim 12, wherein the beamsplitter further comprises at least a first substrate, a first reflector, and a second reflector, the first and second reflectors being mutually parallel planar optical surfaces disposed upon the substrate, the first reflector being partially reflective, the second reflector being fully reflective, the first reflector dividing the primary beam into at least a first energy beam and a second energy beam.

23. A spectrometer, comprising:

a source of a primary beam of radiant energy;

a beamsplitter, fixed relative to the primary beam, the beamsplitter dividing the primary beam into at least a first energy beam and a second energy beam, the first energy beam traversing at least a first optical path, the second energy beam traversing at least a second optical path;

at least a first retroreflector, the first retroreflector positioned to receive the first energy beam and to return the first energy beam to at least the beamsplitter;

a first reflector, the first reflector being a reflective planar optical surface that is fixed in position with respect to the primary energy beam, the first reflector positioned to receive the first energy beam directly from the first retroreflector and to return the first energy beam directly to the first retroreflector, at least a first portion of the first optical path that is traversed by the first energy beam from the first reflector to the first retroreflector being antiparallel to at least a second portion of the first optical path traversed by the first energy beam from at least the first retroreflector to the first reflector, the first retroreflector returning the first energy beam to at- least the beamsplitter;

a second reflector, the second reflector being a reflective planar optical surface, the second reflector being moveable with respect to the primary beam and positioned to receive the second energy beam for at least a first reflection;

a third reflector, the third reflector being a reflective planar optical surface, the third reflector being moveable with respect to the primary beam and positioned to receive the second energy beam for at least a second reflection, the third reflector positioned to receive the first reflection from the second reflector for the second reflection;

a second retroreflector, the second retroreflector positioned to receive the second reflection from at least the third reflector, the second retroreflector returning the second energy beam to at least the third reflector for a third reflection, the third reflection being received by the second reflector for a fourth reflection;

a fourth reflector, the fourth reflector being a reflective planar optical surface, the fourth reflector positioned to receive the fourth reflection and to return the second energy beam to the second reflector for a fifth reflection, at least a first portion of the second optical path that is traversed by the second energy beam from the second reflector to the fourth reflector being antiparallel to at least a second portion of the second optical path traversed by the second energy beam from at least the fourth reflector to the second reflector;

the third reflector receiving the fifth reflection from at least the second reflector for a sixth reflection, the second retroreflector receiving the sixth reflection from at least the third reflector, the second retroreflector returning the second energy beam to the at least the third reflector for a seventh reflection;

the second reflector receiving the seventh reflection from at least the third reflector for an eighth reflection;

the beamsplitter receiving the eighth reflection from at least the second reflector, the returned second energy beam being in reverse order and in an inverted state to make the returned second energy beam complementary with at least the portion of the second energy beam traversing a path from the beamsplitter to at least the second reflector; and the beamsplitter combining at least portions of the first and second energy beams and transmitting the combined portions of the first and second energy beams to a detector.

24. A spectrometer as claimed in claim 23, wherein the second and third reflectors are moved in opposite directions.

25. A spectrometer, comprising:

a source of a primary beam of radiant energy;

a beamsplitter, fixed relative to the primary beam, the beamsplitter dividing the primary beam into at least a first energy beam and a second energy beam, the first energy beam resulting from a first reflection and traversing at least a first optical path, the second energy beam resulting from a first transmission and traversing at least a second optical path;

a first reflector, the first reflector being a reflective planar optical surface, the first reflector being moveable with respect to the primary beam and positioned to receive the first reflection from the beamsplitter for a second reflection;

a second reflector, the second reflector having a first secondary reflector and a second secondary reflector mounted thereon, both the first and second secondary reflectors being reflective planar optical surfaces, the first secondary reflector being parallel to the second secondary reflector, the second reflector being moveable with respect to the primary beam and positioned to receive the second reflection from the first reflector and reflect the first energy beam with the first secondary reflector for a third reflection;

a first retroreflector, the first retroreflector positioned to receive the third reflection from the first secondary reflector and to return the first energy beam to the first secondary reflector for a fourth reflection, the first reflector receiving the fourth reflection for a fifth reflection;

a third reflector, the third reflector being-a reflective planar optical surface, the third reflector positioned to receive the fifth reflection from the first reflector and to return the first energy beam to the first reflector for a sixth reflection, at least a first portion of the first optical path that is traversed by the first energy beam from the first reflector to the third reflector being antiparallel to at least a second portion of the first optical path traversed by the first energy beam from at least the third reflector to the first reflector;

the sixth reflection being received by the first secondary reflector for a seventh reflection, the first retroreflector receiving the seventh reflection and returning the first energy beam to the first secondary reflector for an eighth reflection, the first reflector receiving the eighth reflection for a ninth reflection, the beamsplitter receiving the ninth reflection, the returned first energy beam being in reverse order and in an inverted state to make the returned first energy beam complementary with at least the portion of the first energy beam traversing a path from the beamsplitter to the first reflector;

a fourth reflector, the fourth reflector being a reflective planar optical surface, the fourth reflector being moveable with respect to the primary beam and positioned to receive the second energy beam from the beamsplitter for a tenth reflection, the second secondary reflector receiving the tenth reflection for an eleventh reflection;

a second retroreflector, the second retroreflector positioned to receive the eleventh reflection from the second secondary reflector and to return the second energy beam to the second secondary reflector for a twelfth reflection, the fourth reflector receiving the twelfth reflection for a thirteenth reflection;

a fifth reflector, the fifth reflector being a reflective planar optical surface, the fifth reflector and the third reflector being mutually perpendicular, the fifth reflector positioned to receive the thirteenth reflection from the fourth reflector and to return the second energy beam to the fourth reflector for a fourteenth reflection, at least a first portion of the second optical path that is traversed by the second energy beam from the fourth reflector to the fifth reflector being antiparallel to at least a second portion of the second optical path traversed by the second energy beam from at least the fifth reflector to the fourth reflector;

the second secondary reflector receiving the fourteenth reflection for a fifteenth reflection, the second retroreflector receiving the fifteenth reflection and returning the second energy beam to the second secondary reflector for a sixteenth reflection, the fourth reflector receiving the sixteenth reflection for a seventeenth reflection, the beamsplitter receiving the seventeenth reflection, the returned second energy beam being in reverse order and in an inverted state to make the returned second energy beam complementary with at least the portion of the second energy beam traversing a path from the beamsplitter to the fourth reflector; and the beamsplitter combining at least portions of the first and second energy beams and transmitting the combined portions of the first and second energy beams to a detector.

26. A spectrometer, comprising:

a source of a primary beam of radiant energy;

a beamsplitter, fixed relative to the primary beam, the beamsplitter comprising at least a first substrate, a first reflector, and a second reflector, the first and second reflectors being mutually parallel planar optical surfaces disposed upon the substrate, the first reflector being partially reflective, the second reflector being fully reflective, the first reflector dividing the primary beam into at least a first energy beam and a second energy beam, the first energy beam traversing at least a first optical path, the second energy beam traversing at least a second optical path;

a first retroreflector, the first retroreflector positioned to receive the first energy beam from the first reflector and to reflect the first energy beam to the second reflector;

a third reflector, the third reflector being a reflective planar optical surface, the third reflector positioned to receive the first energy beam from the second reflector and to return the first energy beam to the second reflector, at least a first portion of the first optical path that is traversed by the first energy beam from the second reflector to the third reflector being antiparallel to at least a second portion of the first optical path traversed by the first energy beam from at least the third reflector to the second reflector, the second reflector returning the first energy beam to the first retroreflector, the first retroreflector returning the first energy beam to the first reflector;

a fourth reflector, the fourth reflector being a reflective planar optical surface, the fourth reflector being moveable with respect to the primary beam and positioned to receive the second energy beam from the first reflector;

a second retroreflector, the second retroreflector positioned to receive the second energy beam from at least the fourth reflector and to return the second energy beam to at least the fourth reflector;

the fourth reflector reflecting the second energy beam to the third reflector, the third reflector returning the second energy beam to the fourth reflector, at least a first portion of the second optical path that is traversed by the second energy beam from the fourth reflector to the third reflector being antiparallel to at least a second portion of the second optical path traversed by the second energy beam from at least the third reflector to the fourth reflector, the fourth reflector returning the second energy beam to the second retroreflector, the second retroreflector returning the second energy beam to the fourth reflector, the fourth reflector returning the second energy beam to the first reflector, the returned second energy beam being in reverse order and in an inverted state to make the returned second energy beam complementary with at least the portion of the second energy beam traversing a path from the first reflector to at least the fourth reflector; and the first reflector combining at least, portions of the first and second energy beams and transmitting the combined portions of the first and second energy beams to a detector.

27. A spectrometer as claimed in claim 26, wherein the second energy beam passes through a non-reflective portion of the beamsplitter while traversing the second optical path between the third and fourth reflectors.

28. A spectrometer as claimed in claim 26, wherein the first and second reflectors are disposed upon opposite sides of the first substrate, with the first reflector disposed on the side of the substrate nearest the source.

29. A spectrometer as claimed in claim 26, wherein the first and second reflectors are disposed upon opposite sides of the first substrate, with the first reflector disposed on the side of the substrate farthest from the source.

30. A spectrometer as claimed in claim 26, wherein the first and second reflectors are disposed upon the same side of the first substrate.

31. A spectrometer as claimed in claim 26, wherein the fourth reflector is a rotating disk.

32. A spectrometer as claimed in claim 26, wherein the fourth reflector is a doubly-wedged rotating disk.

33. A spectrometer, comprising:

a source of a primary beam of radiant energy;

a beamsplitter, fixed relative to the primary beam, the beamsplitter comprising at least a first substrate, a first reflector, and a second reflector, the first and second reflectors being mutually parallel planar optical surfaces disposed upon the substrate, the first reflector being partially reflective, the second reflector being fully reflective, the first reflector dividing the primary beam into at least a first energy beam and a second energy beam, the first energy beam traversing at least a first optical path, the second energy beam traversing at least a second optical path;

a third reflector, the third reflector being a reflective optical surface, the third reflector being moveable with respect to the primary beam and positioned to receive the first energy beam from the first reflector;

a first retroreflector, the first retroreflector positioned to receive the first energy beam from the third reflector and to reflect the first energy beam to the third reflector, the third reflector reflecting the first energy beam to the second reflector;

a fourth reflector, ;the fourth reflector being a reflective planar optical surface, the fourth reflector positioned to receive the first energy beam from the second reflector and to return the first energy beam to the second reflector, at least a first portion of the first optical path that is traversed by the first energy beam from the second reflector to the fourth reflector being antiparallel to at least a second portion of the first optical path traversed by the first energy beam from at least the fourth reflector to the second reflector;

the second reflector returning the first energy beam to the third reflector, the third reflector returning the first energy beam to the first retroreflector, the first retroreflector returning the first energy beam to the third reflector, the third reflector returning the first energy beam to the first reflector, the returned first energy beam being in reverse order and in an inverted state to make the returned first energy beam complementary with at least the portion of the first energy beam traversing a path from the first reflector to at least the third reflector;

a second retroreflector, the second retroreflector positioned to receive the second energy beam from at least the first reflector and to reflect the second energy, beam to at least the fourth reflector, the fourth reflector returning the second energy beam to the second retroreflector, at least a first portion of the second optical path that is traversed by the second energy beam from the second retroreflector to the fourth reflector being antiparallel to at least a second portion of the second optical path traversed by the second energy beam from at least the fourth to the second retroreflector;

the second retroreflector returning the second energy beam to at least the first reflector, the returned second energy beam being in reverse order and in an inverted state to make the returned second energy beam complementary with at least the portion of the second energy beam traversing a path from the beamsplitter to the second retroreflector; and the first reflector combining at least portions of the first and second energy beams and transmitting the combined portions of the first and second energy beams to a detector.

34. A spectrometer as claimed in claim 33, wherein the second energy beam passes through a non-reflective portion of the beamsplitter while traversing the second optical path between the second retroreflector and the fourth reflector.

35. A spectrometer as claimed in claim 33, wherein the first and second reflectors are disposed upon opposite sides of the substrate, with the first reflector disposed on the side of the substrate nearest the source.

36. A spectrometer as claimed in claim 33, wherein the first and second reflectors are disposed upon opposite sides of the substrate, with the first reflector disposed on the side of the substrate farthest from the source.

37. A spectrometer as claimed in claim 33 wherein the first and second reflectors are disposed upon the same side of the first substrate.

38. A spectrometer as claimed in claim 33, wherein the first and second reflectors are disposed upon the side of the first substrate nearest to the source.

39. A spectrometer as claimed in claim 33, wherein the first and second reflectors are disposed upon the side of the first substrate farthest from the source.

40. A spectrometer as claimed in claim 33, wherein the third reflector is a rotating disk.

41. At A spectrometer as claimed in claim 33, wherein the third reflector is a doubly-wedged rotating disk.

42. A spectrometer as claimed in claim 33, wherein the beamsplitter further comprises at least a first compensator plate.

43. A spectrometer as claimed in claim 33, wherein the third reflector is a rotating multi-faceted flat mirror.

44. A spectrometer, comprising:

a source of a primary beam of radiant energy;

a beamsplitter, fixed relative to the primary beam, the beamsplitter comprising at least a first substrate, a first reflector, and a second reflector, the first and second reflectors being mutually parallel planar optical surfaces disposed upon the substrate, the first reflector being partially reflective, the second reflector being fully reflective, the first reflector dividing the primary beam into at least a first energy beam and a second energy beam, the first energy beam traversing at least a first optical path, the second energy beam traversing at least a second optical path;

a third reflector, the third reflector being moveable with respect to the primary beam and positioned to receive the first energy beam from the first reflector;

a first retroreflector, the first retroreflector positioned to receive the first energy beam from the third reflector and to reflect the first energy beam to the third reflector, the third reflector reflecting the first energy beam to the second reflector;

a second retroreflector, the second retroreflector positioned to receive the first energy beam from at least the second reflector;

a fourth reflector, the fourth reflector positioned to receive the first energy beam from the second retroreflector and to return the first energy beam to the second retroreflector, the second retroreflector returning the first energy beam to the second reflector, the second reflector returning the first energy beam to the third reflector, the third reflector returning the first energy beam to the first retroreflector, the first retroreflector returning the first energy beam to the third reflector, the third reflector returning the first energy beam to the first reflector, the returned first energy beam being in reverse order and in an inverted state to make the returned first energy beam complementary with at least the portion of the first energy beam traversing a path from the first reflector to at least the third reflector;

the fourth reflector also positioned to receive the second energy beam from at least the first reflector and to return the second energy beam to the first at least the first reflector; and the first reflector combining at least portions of the first and second energy beams and transmitting the combined portions of the first and second energy beams to a detector.

45. A spectrometer as claimed in claim 44, wherein the first energy beam passes through a non-reflective portion of the beamsplitter while traversing the first optical path between the second retroreflector and the fourth reflector.

46. A spectrometer as claimed in claim 44, wherein the first and second reflectors are disposed upon opposite sides of the substrate, with the first reflector disposed on the side of the substrate nearest the source.

47. A spectrometer as claimed in claim 44, wherein the first and second reflectors are disposed upon opposite sides of the substrate, with the first reflector disposed on the side of the substrate farthest from the source.

48. A spectrometer as claimed in claim 44 wherein the first and second reflectors are disposed upon the same side of the first substrate.

49. A spectrometer as claimed in claim 44, wherein the first and second reflectors are disposed upon the side of the first substrate nearest to the source.

50. A spectrometer as claimed in claim 44, wherein the first and second reflectors are disposed upon the side of the first substrate farthest from the source.

51. A spectrometer as claimed in claim 44, wherein the third reflector is a rotating disk.

52. A spectrometer as claimed in claim 44, wherein the third reflector is a doubly-wedged rotating disk.

53. A spectrometer as claimed in claim 44, wherein the beamsplitter further comprises at least a first compensator plate.

54. A spectrometer as claimed in claim 44, wherein the third reflector is a multi-faceted flat mirror.

55. A spectrometer as claimed in claim 44, wherein the third reflector is a reflective planar optical surface.

56. A spectrometer as claimed in claim 44, wherein the fourth reflector is a reflective planar optical surface.

57. A spectrometer as claimed in claim 44, wherein the fourth reflector is a roof reflector.

58. A spectrometer, comprising:

a source of a primary beam of radiant energy;

a beamsplitter, fixed relative to the primary beam, the beamsplitter comprising at least a first substrate, a first reflector, and a second reflector, the first and second reflectors being mutually parallel planar optical surfaces disposed upon the substrate, the first reflector being partially reflective, the second reflector being fully reflective, the first reflector dividing the primary beam into at least a first energy beam and a second energy beam, the first energy beam traversing at least a first optical path, the second energy beam traversing at least a second optical path;

a first retroreflector, the first retroreflector positioned to receive the first energy beam from the first reflector and to reflect the first energy beam to the second reflector;

a third reflector, the third reflector positioned to receive the first energy beam from the second reflector and to return the first energy beam to the second reflector, at least a first portion of the first optical path that is traversed by the first energy beam from the second reflector to the third reflector being antiparallel to at least a second portion of the first optical path traversed by the first energy beam from at least the third reflector to the second reflector, the second reflector returning the first energy beam to the first retroreflector, the first retroreflector returning the first energy beam to the first reflector;

a second retroreflector, the second retroreflector positioned to receive the second energy beam from at least the first reflector and to reflect the second energy beam to at least the third reflector, the third reflector returning the second energy beam to at least the second retroreflector, at least a first portion of the second optical path that is traversed by the second energy beam from the second retroreflector to the third reflector being antiparallel to at least a second portion of the second optical path traversed by the second energy beam from at least the third reflector to the second retroreflector, the second retroreflector returning the second energy beam to at least the first reflector, the returned second energy beam being in reverse order and in an inverted state to make the returned second energy beam complementary with at least the portion of the second energy beam traversing a path from the first reflector to the second retroreflector;

a moveable reflector assembly, the moveable reflector assembly positioned in the second optical path to reflect the second energy beam; and the first reflector combining at least portions of the first and second energy beams and transmitting the combined portions of the first and second energy beams to a detector.

59. A spectrometer as claimed in claim 58, wherein the moving reflector assembly is positioned in the second optical path between the first reflector and the second retroreflector.

60. A spectrometer as claimed in claim 58, wherein the moving reflector assembly is positioned in the second optical path between the second retroreflector and the third reflector.

61. A spectrometer as claimed in claim 59, wherein the moveable reflector assembly comprises a first moveable reflective planar optical surface and a second moveable reflective planar optical surface, the first and second moveable reflective planar optical surfaces being independently moveable and mutually parallel.

62. A spectrometer as claimed in claim 60, wherein the moveable reflector assembly comprises a first moveable reflective planar optical surface and a second moveable reflective planar optical surface, the first and second moveable reflective planar optical surfaces being independently moveable and mutually parallel.

63. A spectrometer as claimed in claim 58, wherein the second energy beam passes through a non-reflective portion of the beamsplitter while traversing the second optical path between the second retroreflector and the third reflector.

64. A spectrometer as claimed in claim 58, wherein the first and second reflectors are disposed upon opposite sides of the substrate, with the first reflector disposed on the side of the substrate nearest the source.

65. A spectrometer as claimed in claim 58, wherein the first and second reflectors are disposed upon opposite sides of the substrate, with the first reflector disposed on the side of the substrate farthest from the source.

66. A spectrometer as claimed in claim 58, wherein the first and second reflectors are disposed upon the same side of the first substrate.

67. A spectrometer as claimed in claim 58, wherein the first and second reflectors are disposed upon the side of the first substrate nearest to the source.

68. A spectrometer as claimed in claim 58, wherein the first and second reflectors are disposed upon the side of the first substrate farthest from the source.

69. A spectrometer as claimed in claim 58, wherein the beamsplitter further comprises at least a first compensator plate.

70. A spectrometer as claimed in claim 58, wherein the third reflector is a reflective planar optical surface.

71. A spectrometer, comprising:

a source of a primary beam of radiant energy;

a beamsplitter, fixed relative to the primary beam, the beamsplitter comprising at least a first substrate, a first reflector, and a second reflector, the first and second reflectors being mutually parallel planar optical surfaces disposed upon the substrate, the first reflector being partially reflective, the second reflector being fully reflective, the first reflector dividing the primary beam into at least a first energy beam and a second energy beam, the first energy beam traversing at least a first optical path, the second energy beam traversing at least a second optical path;

a first retroreflector, the first retroreflector positioned to receive the first energy beam from the first reflector and to reflect the first energy beam to the second reflector;

a third reflector, the third reflector having a first secondary reflective surface and a second secondary reflective surface mounted thereon, the first and second secondary reflective surfaces being mutually parallel, the first secondary reflective surface positioned to receive the first energy beam from the second reflector and to return the first energy beam to the second reflector, at least a first portion of the first optical path that is traversed by the first energy beam from the second reflector to the first secondary reflective surface being antiparallel to at least a second portion of the first optical path traversed by the first energy beam from at least the first secondary reflective surface to the second reflector, the second reflector returning the first energy beam to the first retroreflector, the first retroreflector returning the first energy beam to the first reflector;

a second retroreflector, the second retroreflector positioned to receive the second energy beam from at least the first reflector;

a third retroreflector, the third retroreflector positioned to receive the second energy beam from at least the second retroreflector and to reflect the second energy beam to the second secondary reflective surface, at least a first portion of the second optical path that is traversed by the second energy beam from the third retroreflector to the second secondary reflective surface being antiparallel to at least a second portion of the second optical path traversed by the second energy beam from at least the second secondary reflective surface to the third retroreflector;

the second secondary reflective surface returning the second energy beam to the third retroreflector, the third retroreflector returning the second energy beam to at least the second retroreflector, the second retroreflector returning the second energy beam to at least the first reflector, the returned second energy beam being in reverse order and in an inverted state to make the returned second energy beam complementary with at least the portion of the second energy beam traversing a path from the first reflector to the second retroreflector; and the first reflector combining at least portions of the first and second energy beams and transmitting the combined portions of the first and second energy beams to a detector.

72. A spectrometer as claimed in claim 71, wherein the second energy beam passes through a non-reflective portion of the beamsplitter while traversing the second optical path between the second retroreflector and the third retroreflector.

73. A spectrometer as claimed in claim 71, wherein the first and second reflectors are disposed upon opposite sides of the substrate, with the first reflector disposed on the side of the substrate nearest the source.

74. A spectrometer as claimed in claim 71, wherein the first and second reflectors are disposed upon opposite sides of the substrate, with the first reflector disposed on the side of the substrate farthest from the source.

75. A spectrometer as claimed in claim 71, wherein the first and second reflectors are disposed upon the same side of the first substrate.

76. A spectrometer as claimed in claim 71, wherein the first and second reflectors are disposed upon the side of the first substrate nearest to the source.

77. A spectrometer as claimed in claim 71, wherein the first and second reflectors are disposed upon the side of the first substrate farthest from the source.

78. A spectrometer as claimed in claim 71, wherein the beamsplitter further comprises at least a first compensator plate.

79. A spectrometer as claimed in claim 71, wherein the first and second secondary reflective surfaces are planar optical surfaces.

80. A spectrometer, comprising:

a source of a primary beam of radiant energy;

a beamsplitter, the beamsplitter comprising at least a first substrate, a first reflector, and a second reflector, the first and second reflectors being mutually parallel planar optical surfaces disposed upon the substrate, the first reflector being partially reflective, the second reflector being fully reflective and positioned to reflect the primary beam;

a first retroreflector, the first retroreflector positioned to receive the primary beam from the second reflector and to reflect the primary beam to the first reflector, the first reflector dividing the primary beam into at least a first energy beam and a second energy beam, the first energy beam traversing at least a first optical path, the second energy beam traversing at least a second optical path;

a third reflector, the third reflector positioned to receive the first energy beam from the first reflector and to return the first energy beam to the first reflector, at least a first portion of the first optical path that is traversed by the first energy beam from the first reflector to the third reflector being antiparallel to at least a second portion of the first optical path traversed by the first energy beam from at least the third reflector to the first reflector;

a fourth reflector, the fourth reflector being moveable with respect to the primary beam and positioned to receive the second energy beam from at least the first reflector for a first reflection;

a second retroreflector, the second retroreflector positioned to receive the first reflection from at least the fourth reflector and to return the second energy beam to at least the fourth reflector for a second reflection, the second reflector receiving the second reflection for a third reflection;

a fifth reflector, the fifth reflector positioned to receive the third reflection from at least the second reflector and to return the second energy beam to at least the second reflector for a fourth reflection, at least a first portion of the second optical path that is traversed by the second energy beam from the second reflector to the fifth reflector being antiparallel to at least a second portion of the second optical path traversed by the second energy beam from at least the fifth reflector to the second reflector;

the fourth reflector receiving the fourth reflection for a fifth reflection, the second retroreflector receiving the fifth reflection and returning the second energy beam to at least the fourth reflector for a sixth reflection, the first reflector receiving the sixth reflection, the returned second energy beam being in reverse order and in an inverted state to make the returned second energy beam complementary with at least the portion of the second energy beam traversing a path from the first reflector to the fourth reflector; and the first reflector combining at feast portions of the first and second energy beams and transmitting the combined portions of the first and second energy beams to a detector.

81. A spectrometer as claimed in claim 80, wherein the first and second reflectors are disposed upon opposite sides of the substrate, with the first reflector disposed on, the side of the substrate nearest the source.

82. A spectrometer as claimed in claim 80, wherein the first and second reflectors are disposed upon opposite sides of the substrate, with the first reflector disposed own the side of the substrate farthest from the source.

83. A spectrometer as claimed in claim 80, wherein the first and second reflectors are disposed upon the same side of the first substrate.

84. A spectrometer as claimed in claim 80, wherein the first and second reflectors are disposed upon the side of the first substrate nearest to the source.

85. A spectrometer as claimed in claim 80, wherein the first and second reflectors are disposed upon the side of the first substrate farthest from the source.

86. A spectrometer as claimed in claim 80, wherein the beamsplitter further comprises at least a first compensator plate.

* * * * *